US012800960B2

(12) United States Patent
Yang et al.

(10) Patent No.: US 12,800,960 B2
(45) Date of Patent: Nov. 17, 2026

(54) CATADIOPTRIC LENS ASSEMBLY

(71) Applicant: Apple Inc., Cupertino, CA (US)

(72) Inventors: Young Cheol Yang, Sunnyvale, CA (US); Fuyi Yang, San Jose, CA (US); Se Hyun Ahn, Santa Clara, CA (US); Seung Hoon Lee, Santa Clara, CA (US); Zhibing Ge, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 418 days.

(21) Appl. No.: 18/426,673

(22) Filed: Jan. 30, 2024

(65) Prior Publication Data

US 2024/0353708 A1 Oct. 24, 2024

Related U.S. Application Data

(60) Provisional application No. 63/497,531, filed on Apr. 21, 2023.

(51) Int. Cl.
*G02F 1/1335* (2006.01)
*G02F 1/13363* (2006.01)
*G02F 1/137* (2006.01)

(52) U.S. Cl.
CPC .................. *G02F 1/133526* (2013.01); *G02F 1/133536* (2013.01); *G02F 1/133638* (2021.01); *G02F 1/13718* (2013.01)

(58) Field of Classification Search
CPC ......... G02F 1/133526; G02F 1/133536; G02F 1/133638; G02F 1/13718
See application file for complete search history.

(56) References Cited

U.S. PATENT DOCUMENTS

| | | | |
|---|---|---|---|
| 9,323,059 B2 | 4/2016 | Wang et al. | |
| 10,203,489 B2 | 2/2019 | Khan et al. | |
| 10,663,745 B2 | 5/2020 | Ouderkirk et al. | |
| 11,719,936 B2 | 8/2023 | He et al. | |
| 2014/0368544 A1 | 12/2014 | Kobayashi | |
| 2016/0041396 A1 | 2/2016 | Kawamura et al. | |
| 2018/0039052 A1 | 2/2018 | Khan et al. | |
| 2019/0086675 A1 | 3/2019 | Carollo et al. | |
| 2019/0285891 A1 | 9/2019 | Lam et al. | |
| 2020/0081253 A1 | 3/2020 | Montevirgen et al. | |
| 2020/0142254 A1 | 5/2020 | Ryu et al. | |
| 2020/0341268 A1 | 10/2020 | Amirsolaimani et al. | |
| 2020/0348528 A1 | 11/2020 | Jamali et al. | |
| 2020/0356053 A1 | 11/2020 | Seo et al. | |
| 2021/0294105 A1* | 9/2021 | He | G02B 27/0172 |

FOREIGN PATENT DOCUMENTS

| | | |
|---|---|---|
| WO | 2015151004 A1 | 10/2015 |
| WO | 2022150267 A1 | 7/2022 |

* cited by examiner

*Primary Examiner* — James A Dudek
(74) *Attorney, Agent, or Firm* — Treyz Law Group, P.C.; Joseph F. Guihan

(57) ABSTRACT

An electronic device may include a display system configured to produce light and a lens assembly that receives the light from the display panel. The lens assembly may include one or more lens elements, one or more cholesteric liquid crystal layers, one or more quarter wave plates, one or more linear polarizers, one or more reflective polarizers, and/or a partially reflective layer. The display system may include a display panel, a linear polarizer, one or more quarter wave plates, and/or a geometric phase lens.

18 Claims, 17 Drawing Sheets

CATADIOPTRIC LENS ASSEMBLY

This application claims the benefit of U.S. provisional patent application No. 63/497,531, filed Apr. 21, 2023, which is hereby incorporated by reference herein in its entirety.

BACKGROUND

This relates generally to optical systems and, more particularly, to optical systems in electronic devices.

Electronic devices such as head-mounted devices use lenses to display images for a user. A microdisplay may create images for each of a user's eyes. A lens may be placed between each of the user's eyes and a portion of the microdisplay so that the user may view virtual reality content.

If care is not taken, a head-mounted device may be cumbersome and tiring to wear. Optical systems for head-mounted devices may use arrangements of lenses that are bulky and heavy. Extended use of a head-mounted device with this type of optical system may be uncomfortable.

It would therefore be desirable to be able to provide improved electronic devices.

SUMMARY

An electronic device may include a display system that comprises an array of display pixels, a linear polarizer, and at least one quarter wave plate, and a lens module that receives light from the display system and that comprises a lens element, a cholesteric liquid crystal layer that is interposed between the lens element and the display system, and a partially reflective layer. The lens element may be interposed between the cholesteric liquid crystal layer and the partially reflective layer.

An electronic device may include a display system that comprises an array of display pixels, a first linear polarizer, and a first quarter wave plate, and a lens module that receives light from the display system and that comprises a lens element, a partially reflective layer that is interposed between the lens element and the display system, a cholesteric liquid crystal layer, a second quarter wave plate, and a second linear polarizer. The lens element may be interposed between the cholesteric liquid crystal layer and the partially reflective layer. The cholesteric liquid crystal layer may be interposed between the second quarter wave plate and the partially reflective layer. The second quarter wave plate may be interposed between the second linear polarizer and the cholesteric liquid crystal layer.

An electronic device may comprise a display system that comprises an array of display pixels, a linear polarizer, and at least one quarter wave plate, and a lens module that receives light from the display system and that comprises a reflective polarizer, a partially reflective layer, a cholesteric liquid crystal layer, a first lens element that is interposed between the reflective polarizer and the partially reflective layer, and a second lens element that is interposed between the partially reflective layer and the cholesteric liquid crystal layer.

An electronic device may include a display system that comprises an array of display pixels, a linear polarizer, at least one quarter wave plate, and a geometric phase lens, and a lens module that receives light from the display system and that comprises a cholesteric liquid crystal layer, a partially reflective layer, and a lens element that is interposed between the cholesteric liquid crystal layer and the partially reflective layer.

An electronic device may include a display system that comprises an array of display pixels, a linear polarizer, a first quarter wave plate interposed between the array of display pixels and the linear polarizer, and a geometric phase lens interposed between the first quarter wave plate and the array of display pixels, and a lens module that receives light from the display system and that comprises a first reflective polarizer, a partially reflective layer, a second reflective polarizer, a first lens element that is interposed between the first reflective polarizer and the partially reflective layer, and a second lens element that is interposed between the second reflective polarizer and the partially reflective layer.

DETAILED DESCRIPTION

Figure 1:
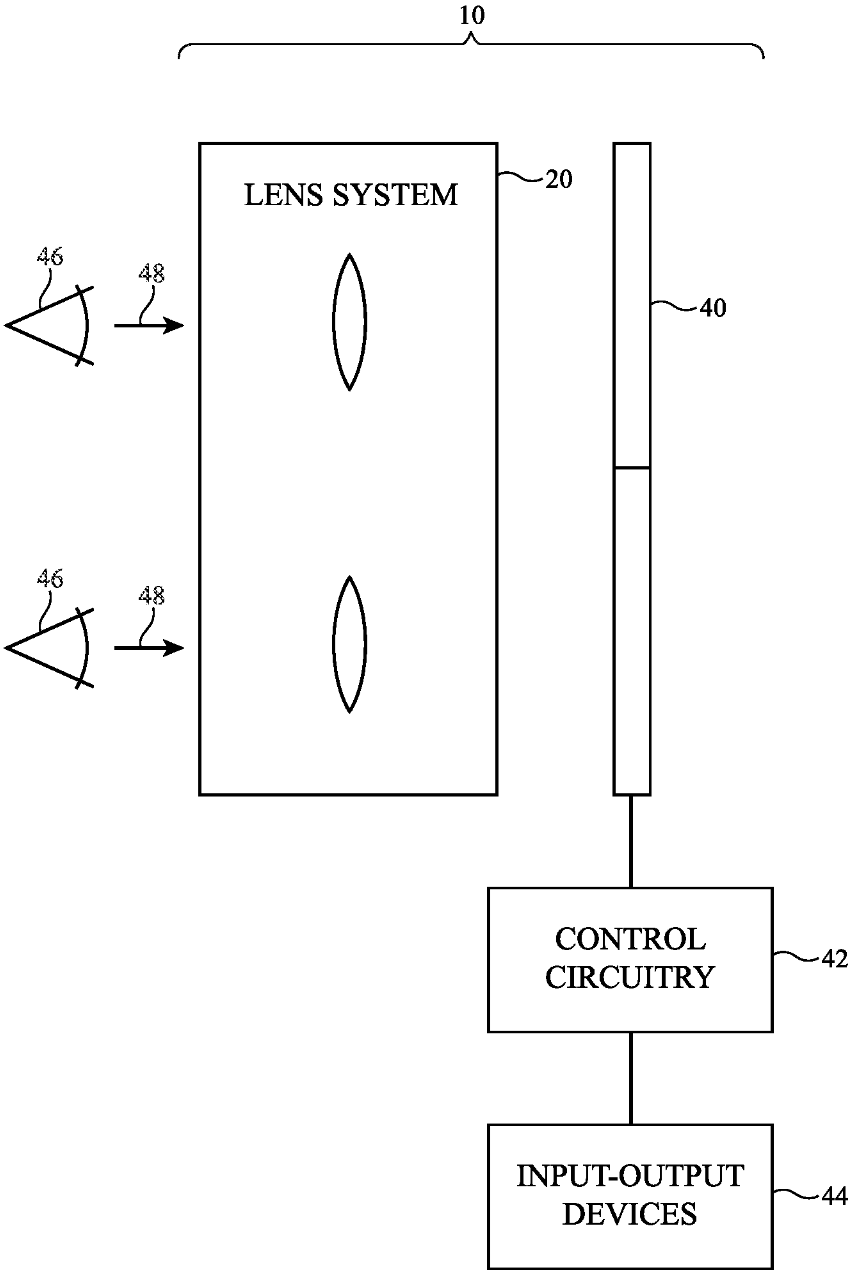
FIG. 1 is a diagram of an illustrative electronic device in accordance with some embodiments.

An illustrative electronic device of the type that may be provided with a display is shown in FIG. 1. As shown in FIG. 1, electronic device 10 (sometimes referred to as glasses 10, virtual reality glasses 10, augmented reality glasses 10, extended reality glasses 10, head-mounted device 10, head-mounted display 10, device 10, etc.) may include a display system such as display system 40 that creates images and may have an optical system such as optical system 20 through which a user (see, e.g., user's eyes 46) may view the images produced by display system 40 by looking in direction 48.

Display system 40 (sometimes referred to as display panel 40 or display 40) may be based on a liquid crystal display, an organic light-emitting diode display, an emissive display having an array of crystalline semiconductor light-emitting diode dies, and/or displays based on other display technologies. Separate left and right displays may be included in system 40 for the user's left and right eyes or a single display may span both eyes.

Visual content (e.g., image data for still and/or moving images) may be provided to display system (display) 40 using control circuitry 42 that is mounted in electronic device 10 and/or control circuitry that is mounted outside of electronic device 10 (e.g., in an associated portable electronic device, laptop computer, or other computing equipment). Control circuitry 42 may include storage such as hard-disk storage, volatile and non-volatile memory, electrically programmable storage for forming a solid-state drive, and other memory. Control circuitry 42 may also include one or more microprocessors, microcontrollers, digital signal processors, graphics processors, baseband processors, application-specific integrated circuits, and other processing circuitry. Communications circuits in circuitry 42 may be used to transmit and receive data (e.g., wirelessly and/or over wired paths). Control circuitry 42 may use display system 40 to display visual content such computer-generated content, pre-recorded video for a movie or other media, or other images. In general, any suitable content may be presented to a user by control circuitry 42 using display system 40 and optical system 20 of electronic device 10.

Input-output devices 44 may be coupled to control circuitry 42. Input-output devices 44 may be used to gather user input from a user, may be used to make measurements on the environment surrounding electronic device 10, may be used to provide output to a user, and/or may be used to supply output to external electronic equipment. Input-output devices 44 may include buttons, joysticks, keypads, keyboard keys, touch sensors, track pads, displays, touch screen displays, microphones, speakers, light-emitting diodes for providing a user with visual output, sensors (e.g., a force sensors, temperature sensors, magnetic sensor, accelerometers, gyroscopes, and/or other sensors for measuring orientation, position, and/or movement of electronic device 10, proximity sensors, capacitive touch sensors, strain gauges, gas sensors, pressure sensors, ambient light sensors, and/or other sensors). If desired, input-output devices 44 may include one or more cameras/optical sensors (e.g., cameras for capturing images of the user's surroundings, cameras for performing gaze detection operations by viewing eyes 46, and/or other cameras).

Figure 2:
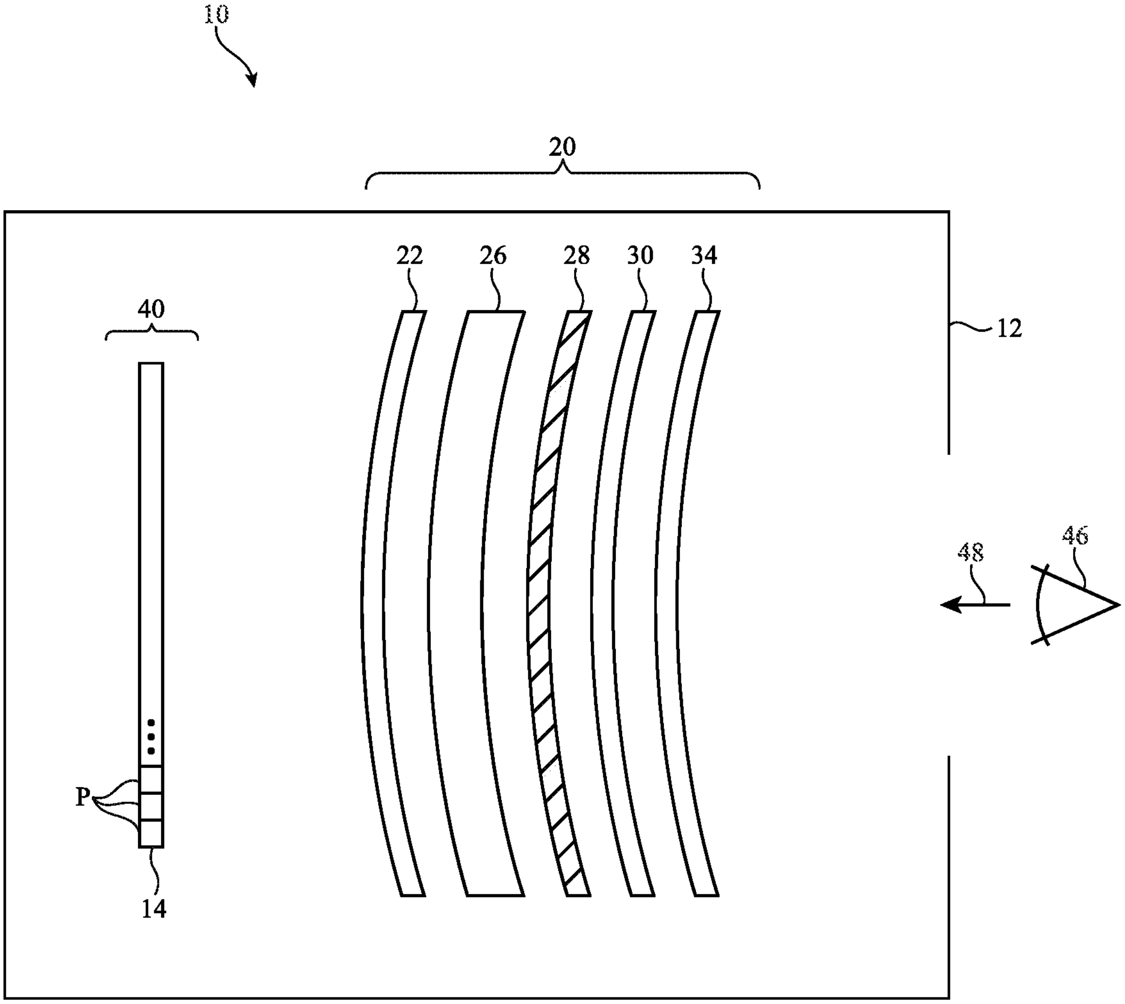
FIG. 2 is a side view of an illustrative electronic device with a display system and a lens module in accordance with some embodiments.

FIG. 2 is a side view of electronic device 10 showing how optical system 20 and display system 40 may be supported by head-mounted support structures such as housing 12 for electronic device 10. Housing 12 may have the shape of a frame for a pair of glasses (e.g., electronic device 10 may resemble eyeglasses), may have the shape of a helmet (e.g., electronic device 10 may form a helmet-mounted display), may have the shape of a pair of goggles, or may have any other suitable housing shape that allows housing 12 to be worn on the head of a user. Configurations in which housing 12 supports optical system 20 and display system 40 in front of a user's eyes (e.g., eyes 46) as the user is viewing system 20 and display system 40 in direction 48 may sometimes be described herein as an example. If desired, housing 12 may have other desired configurations.

Housing 12 may be formed from plastic, metal, fiber-composite materials such as carbon-fiber materials, wood and other natural materials, glass, other materials, and/or combinations of two or more of these materials.

Input-output devices 44 and control circuitry 42 may be mounted in housing 12 with optical system 20 and display system 40 and/or portions of input-output devices 44 and control circuitry 42 may be coupled to electronic device 10 using a cable, wireless connection, or other signal paths.

Display system 40 and the optical components of electronic device 10 may be configured to display images for user 46 using a lightweight and compact arrangement. Optical system 20 (sometimes referred to as a lens assembly, lens module, optical assembly, optical module, etc.) may, for example, be based on catadioptric lenses (e.g., lenses that use both reflecting and refracting of light). Optical system 20 may therefore sometimes be referred to as a catadioptric optical assembly, a catadioptric lens assembly, a catadioptric optical module, a catadioptric lens module, etc.

Display system 40 may include a source of images such as pixel array 14. Pixel array 14 may include a two-dimensional array of pixels P that emits image light (e.g., organic light-emitting diode pixels, light-emitting diode pixels formed from semiconductor dies, liquid crystal display pixels with a backlight, liquid-crystal-on-silicon pixels with a frontlight, etc.). Display system 40 may also include additional optical components such as a linear polarizer, a wave plate such as a quarter wave plate, etc.

Optical system 20 may include a lens element such as lens element 26 (sometimes referred to as lens 26). Lens element 26 may be formed from a transparent material such as plastic or glass. Lens element 26 may have a surface that faces display system 40 (sometimes referred to as a display-facing surface) and a surface that faces the user (sometimes referred to as an eye-facing surface or viewer-facing surface). Each surface of lens element 26 may be a convex surface (e.g., a spherically convex surface, a cylindrically convex surface, or an aspherically convex surface), a concave surface (e.g., a spherically concave surface, a cylindrically concave surface, or an aspherically concave surface), or a freeform surface. A freeform surface may include both convex and concave portions. Alternatively, a freeform surface may have varying convex curvatures or varying concave curvatures (e.g., different portions with different radii of curvature, portions with curvature in one direction and different portions with curvature in two directions, etc.). Herein, a freeform surface that is primarily convex (e.g., the majority of the surface is convex and/or the surface is convex at its center) may sometimes still be referred to as a convex surface and a freeform surface that is primarily concave (e.g., the majority of the surface is concave and/or the surface is concave at its center) may sometimes still be referred to as a concave surface.

A spherically curved surface (e.g., a spherically convex or spherically concave surface) may have a constant radius of curvature across the surface. In contrast, an aspherically curved surface (e.g., an aspheric concave surface or an aspheric convex surface) may have a varying radius of curvature across the surface. A cylindrical surface may only be curved about one axis instead of about multiple axes as with the spherical surface. In some cases, one of the lens surfaces may have an aspheric surface that changes from being convex (e.g., at the center) to concave (e.g., at the edges) at different positions on the surface. This type of surface may be referred to as an aspheric surface, a primarily convex (e.g., the majority of the surface is convex and/or the surface is convex at its center) aspheric surface, a freeform surface, and/or a primarily convex (e.g., the majority of the surface is convex and/or the surface is convex at its center) freeform surface. In one illustrative arrangement, shown in FIG. 2, the surface of lens element 26 facing display system 40 is a convex surface and the surface of lens element 26 facing eye 46 is a concave surface. The first and second opposing surfaces of lens element 26 may have different curvature (e.g., different radius of curvature, one surface may have spherical curvature and the other surface may have cylindrical curvature, etc.).

Optical structures such as partially reflective coatings, wave plates, reflective polarizers, linear polarizers, antireflection coatings, and/or other optical components may be incorporated into electronic device 10 (e.g., lens assembly 20, etc.). These optical structures may allow light rays from display system 40 to pass through and/or reflect from surfaces in optical system 20, thereby providing optical system 20 with a desired lens power.

An illustrative arrangement for the optical layers is shown in FIG. 2. As shown in FIG. 2, a partially reflective mirror (e.g., a metal mirror coating or other mirror coating such as a dielectric multilayer coating with a 50% transmission and a 50% reflection) such as partially reflective mirror 22 may be formed on the convex surface of lens element 26. Partially reflective mirror 22 may sometimes be referred to as beam splitter 22, half mirror (HM) 22, partially reflective layer 22, etc. Partially reflective layer 22 may have a reflectance that is greater than 20%, greater than 40%, less than 80%, less than 60%, between 40% and 60%, etc.

A wave plate such as wave plate 28 may be formed on the concave surface of lens element 26. Wave plate 28 may be attached to lens element 26 (e.g., using an optically clear adhesive layer or via coating directly to the lens element without an intervening adhesive layer). Wave plate 28 (sometimes referred to as retarder 28, quarter wave plate (QWP) 28, etc.) may be a quarter wave plate that conforms to the concave surface of lens element 26. Retarder 28 may be a coating on the concave surface S2 of lens element 26.

Reflective polarizer 30 may be attached to retarder 28 (e.g., using an optically clear adhesive layer or via coating directly to the retarder without an intervening adhesive layer). Reflective polarizer 30 may have orthogonal reflection and pass axes. Light that is polarized parallel to the reflection axis of reflective polarizer 30 will be reflected by reflective polarizer 30. Light that is polarized perpendicular to the reflection axis and therefore parallel to the pass axis of reflective polarizer 30 will pass through reflective polarizer 30. Reflective polarizer 30 may sometimes be referred to as an advanced polarization film (APF).

Polarizer 34 may be attached to reflective polarizer 30 (e.g., using an optically clear adhesive layer or via coating directly to the reflective polarizer without an intervening adhesive layer). Polarizer 34 may be a linear polarizer (LP). Polarizer 34 may sometimes be referred to as an external blocking linear polarizer 34 or cleanup polarizer 34. Linear polarizer 34 may have a pass axis aligned with the pass axis of reflective polarizer 30.

The arrangement of optical module 20 in FIG. 2 is merely illustrative. In general, the optical module may include any desired number of lens elements and any desired arrangement of functional layers. As additional examples, the optical module may include one or more additional lens elements. At least one of the lens elements in optical module 20 may be a removable lens element if desired. A user may be able to easily remove and replace a removable lens element within lens assembly 20. This may allow the removable lens element to be customizable (e.g., to adjust for a user's changing eyesight). At least one of the lens elements in optical module 20 may be a non-removable lens element and may be referred to as a permanent lens element, fixed lens element, non-removable lens element, etc.

Optical module 20 may also include a cholesteric liquid crystal layer. The cholesteric liquid crystal layer may include twisted nematic liquid crystal. The cholesteric liquid crystal layer functions as a reflective circular polarizer that reflects one handedness of circularly polarized light and transmits the opposite handedness of circularly polarized light. When light is reflected, the reflected light has the same handedness as the incident light.

Figure 3:
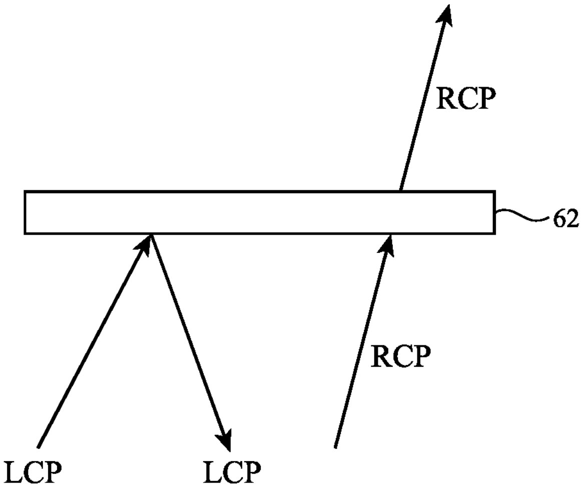
FIG. 3 is a side view of an illustrative cholesteric liquid crystal layer in accordance with some embodiments.

FIG. 3 shows an example of a cholesteric liquid crystal (CLC) layer 62. As shown, the cholesteric liquid crystal layer may be configured to reflect left-handed (e.g., counter-clockwise) circularly polarized (LCP) light and transmit right-handed (e.g., clockwise) circularly polarized (RCP) light. Left-handed circularly polarized light that is incident upon the cholesteric liquid crystal layer is reflected as left-handed circularly polarized light. Right-handed circularly polarized light that is incident upon the cholesteric liquid crystal layer is transmitted through the cholesteric liquid crystal layer.

The example of RCP light being transmitted and LCP light being reflected in FIG. 3 is merely illustrative. The reverse arrangement may instead be used, with LCP light being transmitted and RCP light being reflected.

Figure 4A:
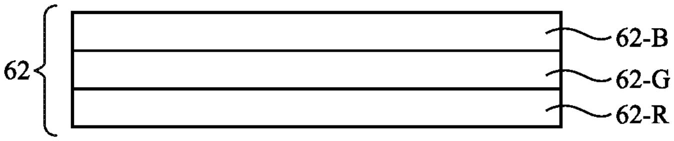
FIG. 4A is a side view of an illustrative cholesteric liquid crystal layer with three layers tuned to respective wavelengths in accordance with some embodiments.

To optimize the performance of the cholesteric liquid crystal layer across the visible light range, the cholesteric liquid crystal layer may include stacked cholesteric liquid crystal layers that are each tuned to a particular wavelength. As shown in FIG. 4A, the cholesteric liquid crystal layer 62 includes a first cholesteric liquid crystal layer 62-B that is tuned for selectively reflecting and transmitting blue light, a second cholesteric liquid crystal layer 62-G that is tuned for selectively reflecting and transmitting green light, and a third cholesteric liquid crystal layer 62-R that is tuned for selectively reflecting and transmitting red light. The liquid crystals in layers 62-B, 62-R, and 62-G may have different pitches to optimize each layer for the target wavelength.

Figure 4B:
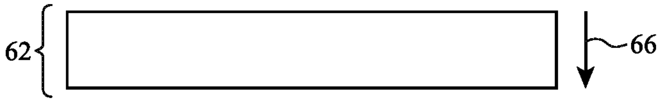
FIG. 4B is a side view of an illustrative cholesteric liquid crystal layer with a gradient in accordance with some embodiments.

In another possible arrangement, shown in FIG. 4B, a single cholesteric liquid crystal layer may have a gradient pitch (e.g., liquid crystals in the layer have a pitch that gradually changes along direction 66). At the upper surface, the pitch may be optimized for blue light. At the lower surface, the pitch may be optimized for red light. The pitch may gradually change from the pitch at the upper surface to the pitch at the lower surface across the thickness of layer 62.

Optical module 20 may also include a geometric phase lens (GPL). A geometric phase lens is a diffractive-type lens based on geometric phase. The geometric phase lens may be achieved using liquid crystal. To form the geometric phase lens, a flat liquid crystal film may be formed on a transparent substrate (e.g., glass, plastic, etc.). The liquid crystal film may include three-dimensional patterns of liquid crystals. The liquid crystals may manipulate the polarization of optical beams passing through the liquid crystals, which modulates the geometric phase of the optical beam. The geometric phase may be modulated in a spatially varying fashion to provide desired light redirecting effects. A geometric phase lens may redirect light using polarization-dependent diffraction and therefore may be considered a diffractive-type lens.

Figure 5A:
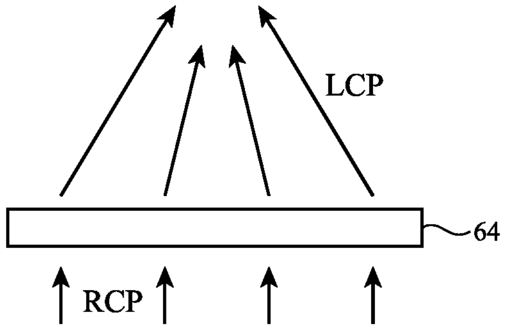
FIG. 5A is a side view of an illustrative geometric phase lens receiving right-handed circularly polarized light in accordance with some embodiments.
Figure 5B:
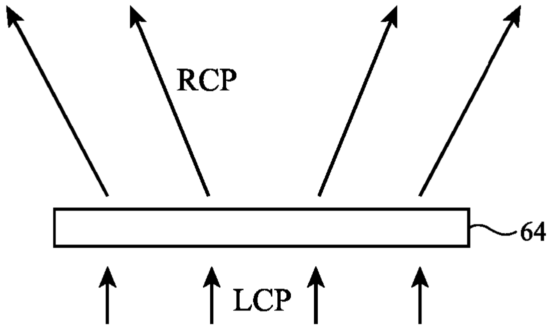
FIG. 5B is a side view of the illustrative geometric phase lens of FIG. 5A receiving left-handed circularly polarized light in accordance with some embodiments.

FIGS. 5A and 5B are cross-sectional side views of an illustrative geometric phase lens showing how the geometric phase lens may redirect light. In the example of FIG. 5A, the geometric phase lens may receive incident light that is right-handed circularly polarized (RCP). This type of light may be focused to a focal point (e.g., f>0) by the geometric phase lens. The output light may be left-handed circularly polarized (LCP). This light may be referred to as a +1 order image.

In contrast, when the geometric phase lens receives incident light that is left-handed circularly polarized (LCP), as in FIG. 5B, the light may be spread (e.g., f<0) by the geometric phase lens. The output light may be right-handed circularly polarized (RCP). This light may be referred to as a −1 order image.

Therefore, if the incident light received by the geometric phase lens is all left-handed circular polarized, the light will be spread (as in FIG. 5B). If the incident light received by the geometric phase lens is all right-handed circular polarized, the light will be focused (as in FIG. 5A). If the incident light received by the geometric phase lens is linearly polarized or unpolarized, approximately half of the light will be spread (as in FIG. 5B) and approximately half of the light will be focused (as in FIG. 5A). In other words, two separate images (e.g., a +1 order image and a −1 order image) will be produced by the geometric phase lens. The example of incident RCP light being focused and incident LCP light being spread in FIGS. 5A and 5B is merely illustrative. The reverse arrangement may instead be used, with incident LCP light being focused and incident RCP light being spread.

The example of forming the geometric phase lens using liquid crystal is merely illustrative. In another possible embodiment, the geometric phase lens may be formed using a metasurface. The metasurface may include shaped nanostructures that modify the phase of incident light. The nanostructures may have a thickness of less than 200 nanometers, less than 100 nanometers, less than 50 nanometers, less than 20 nanometers, less than 10 nanometers, etc. The nanostructures may have a longest dimension (e.g., length) of less than 1 micron, less than 2 microns, less than 0.5 microns, less than 0.1 microns, etc.).

The geometric phase lens shown herein may have the advantage of being flat (e.g., with planar upper and lower surfaces that are parallel to the surface of the display panel) and may be very thin. The geometric phase lens therefore adds minimal volume and weight to the device. The thickness of the active layer (e.g., the liquid crystal layer) in the geometric phase lens may be less than 20 microns, less than 10 microns, less than 5 microns, less than 3 microns, less than 1 micron, between 1 and 10 microns, greater than 1 micron, etc. The total thickness of the geometric phase lens (including the transparent substrate, one or more alignment layers, an optional additional substrate, etc.) may be less than 10 microns, less than 20 microns, less than 50 microns, less than 100 microns, less than 500 microns, between 10 and 100 microns, greater than 10 microns, greater than 30 microns, etc.

FIGS. 6-18 are diagrams of illustrative electronic devices with display systems 40 and/or optical modules 20 that include cholesteric liquid crystal layers and/or geometric phase lenses. In FIGS. 6-18, display panel 14 is identified using the label OLED, linear polarizers are identified using the label LP, quarter wave plates are identified using the label QWP, partially reflective layers are identified using the label HM, reflective polarizers are identified using the label APF, cholesteric liquid crystal layers are identified using the label CLC, geometric phase lenses are identified using the label GPL, right-handed circularly polarized light is identified using the label RCP, left-handed circularly polarized light is identified using the label LCP, light that is linearly polarized along the X-axis is identified using the label X, and light that is linearly polarized along the Y-axis is identified using the label Y. When light is not transmitted through a layer, symbol 68 is used. The brightness of rays of light within the electronic device is identified using percentages, with the percentage representing the intensity of light relative to the display emission intensity (e.g., the display emits light with 100% intensity).

Figure 6:
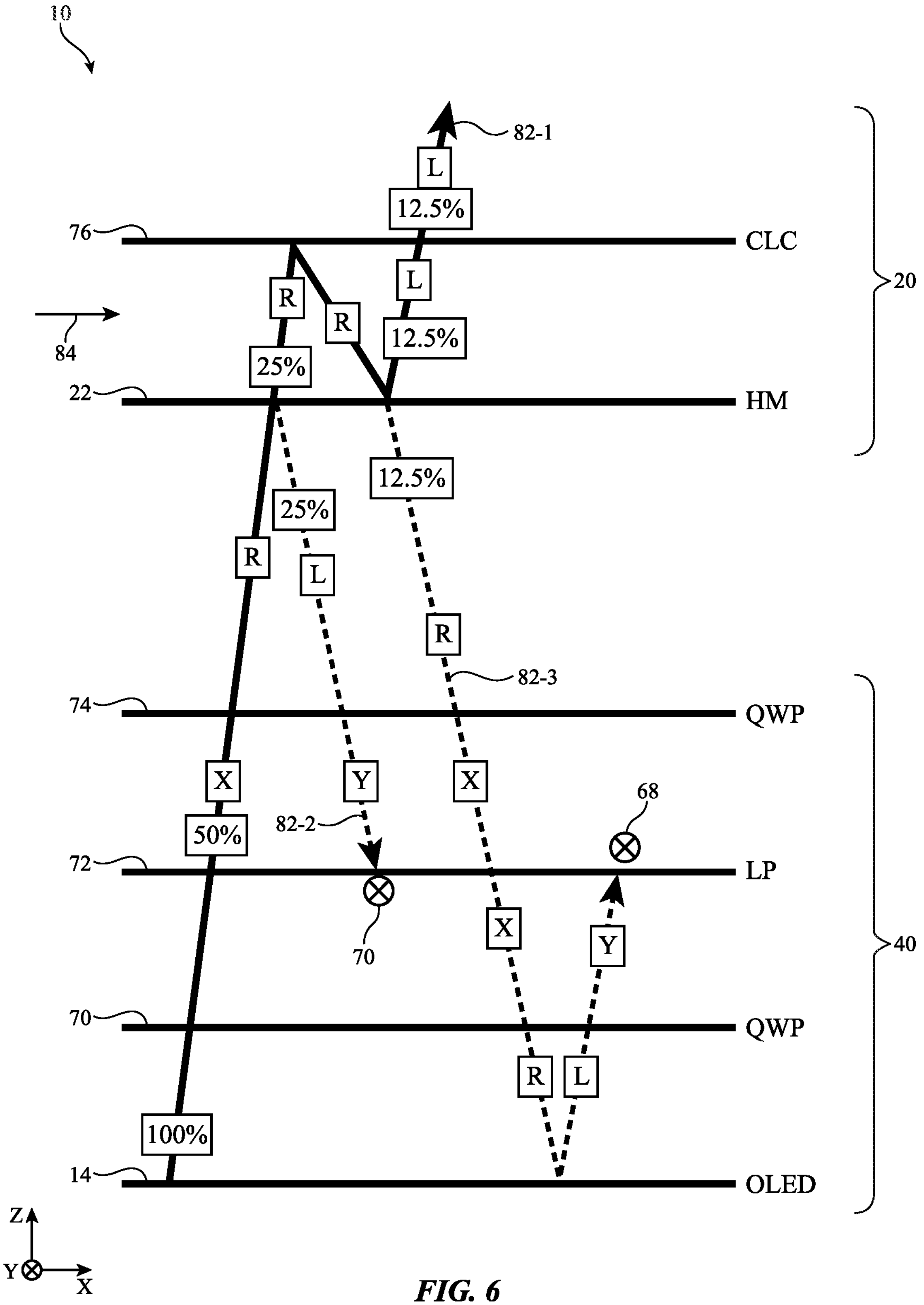
FIG. 6 is a side view of an illustrative electronic device with a display system having a linear polarizer and two quarter wave plates and a lens module having a partially reflective layer and a cholesteric liquid crystal layer in accordance with some embodiments.

In the arrangement of FIG. 6, display system 40 includes display panel 14, quarter wave plate 70, linear polarizer 72, and quarter wave plate 74. Quarter wave plate 70 is interposed between linear polarizer 72 and display panel 14. Linear polarizer 72 is interposed between quarter wave plate 70 and quarter wave plate 74. Quarter wave plate 74 is interposed between linear polarizer 72 and lens module 20.

In the arrangement of FIG. 6, lens module 20 includes a partially reflective layer 22 and a cholesteric liquid crystal layer 76. Partially reflective layer 22 is interposed between display system 40 and the cholesteric liquid crystal layer 76.

Lens module 20 may be configured to receive circularly polarized light of a given handedness from display system 40. Cholesteric liquid crystal layer 76 in FIG. 6 is configured to reflect circularly polarized light with the given handedness of the light received from display system 40. In other words, lens module 20 in FIG. 6 receives right-handed circularly polarized light from display system 40. Cholesteric liquid crystal layer 76 in lens module 20 reflects right-handed circularly polarized light and transmits left-handed circularly polarized light.

As shown in FIG. 6, light following a primary path 82-1 is emitted from display panel 14 and passes through quarter wave plate 70, linear polarizer 72, and quarter wave plate 74. The light exits display system 40 as right-handed circularly polarized light. The light passes through partially reflective layer 22, is reflected from cholesteric liquid crystal layer 76, is reflected from partially reflective layer 22, and then passes through cholesteric liquid crystal layer 76 towards a viewer.

Some light (along path 82-2) is reflected at the first incidence upon partially reflective layer 22. This light reenters display system 40, is transmitted through quarter wave plate 74, and is ultimately absorbed by linear polarizer 72.

Some light (along path 82-3) is transmitted at the second incidence upon partially reflective layer 22 after reflecting off cholesteric liquid crystal layer 76. This light reenters display system 40, is transmitted through quarter wave plate 74, linear polarizer 72, and quarter wave plate 70, reflects off of display panel 14, is transmitted through quarter wave plate 70, and is ultimately absorbed by linear polarizer 72.

Figure 7:
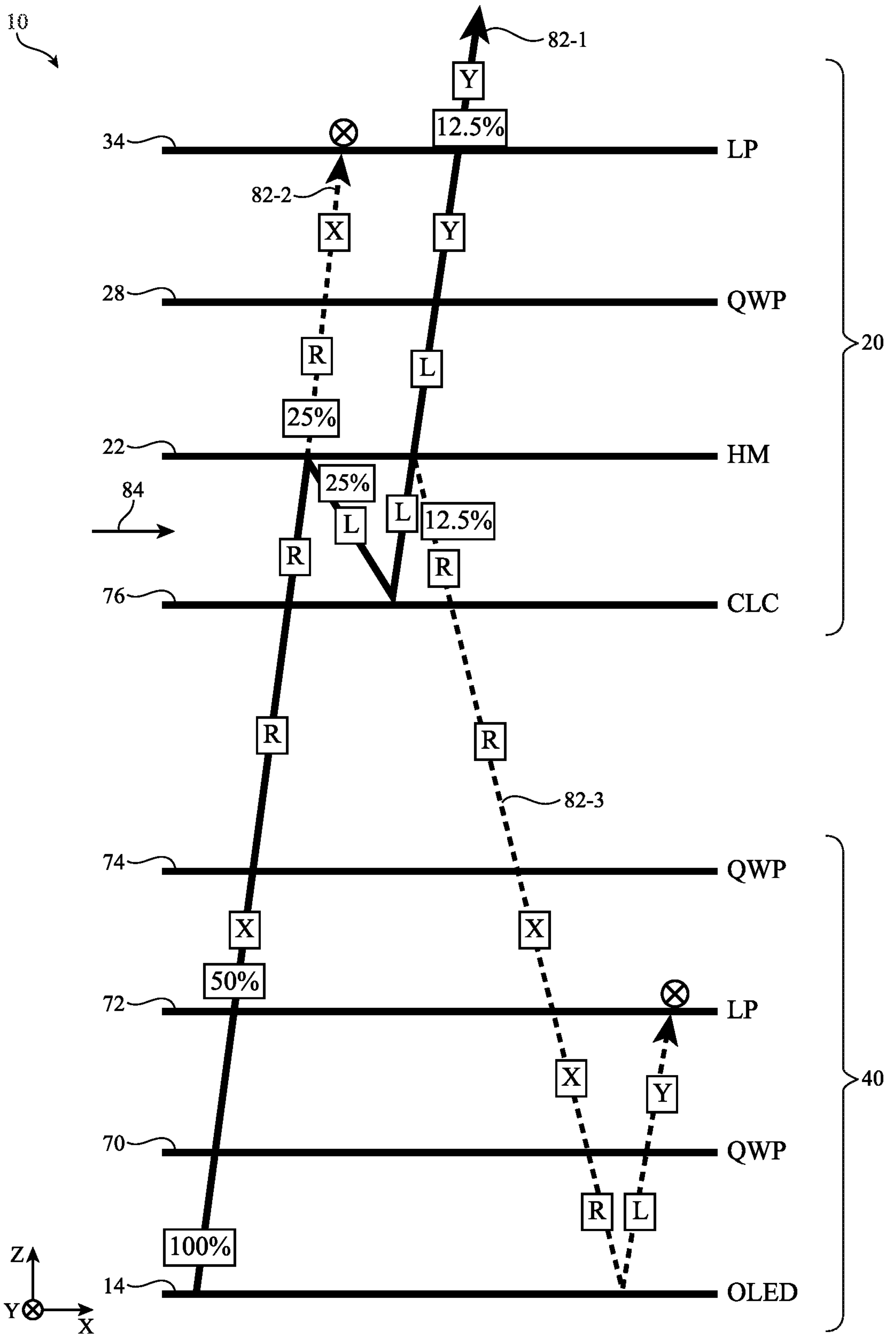
FIG. 7 is a side view of an illustrative electronic device with a display system having a linear polarizer and two quarter wave plates and a lens module having a partially reflective layer, a cholesteric liquid crystal layer, a quarter wave plate, and a linear polarizer in accordance with some embodiments.

In the arrangement of FIG. 7, display system 40 is the same as in FIG. 6. In the arrangement of FIG. 7, lens module 20 includes a cholesteric liquid crystal layer 76, a partially reflective layer 22, a quarter wave plate 28, and a linear polarizer 34. Cholesteric liquid crystal layer 76 is interposed between display system 40 and partially reflective layer 22. Partially reflective layer 22 is interposed between cholesteric liquid crystal layer 76 and quarter wave plate 28. Quarter wave plate 28 is interposed between partially reflective layer 22 and linear polarizer 34.

Lens module 20 may be configured to receive circularly polarized light of a given handedness from display system 40 in FIG. 7. Cholesteric liquid crystal layer 76 in FIG. 7 is configured to transmit circularly polarized light with the given handedness of the light received from display system 40. In other words, lens module 20 in FIG. 7 receives right-handed circularly polarized light from display system 40. Cholesteric liquid crystal layer 76 in lens module 20 transmits right-handed circularly polarized light and reflects left-handed circularly polarized light.

As shown in FIG. 7, light following a primary path 82-1 is emitted from display panel 14 and passes through quarter wave plate 70, linear polarizer 72, and quarter wave plate 74. The light exits display system 40 as right-handed circularly polarized light. The light passes through cholesteric liquid crystal layer 76, is reflected by partially reflective layer 22, is reflected by cholesteric liquid crystal layer 76, and then passes through partially reflective layer 22, quarter wave plate 28, and linear polarizer 34 towards a viewer.

Some light (along path 82-2) is transmitted at the first incidence upon partially reflective layer 22. This light passes through quarter wave plate 28 and is ultimately absorbed by linear polarizer 34.

Some light (along path 82-3) is reflected by the partially reflective layer 22 at the second incidence of the light upon the partially reflective layer. This light passes through cholesteric liquid crystal layer 76 and reenters display system 40. The light on path 82-3 is transmitted through quarter wave plate 74, linear polarizer 72, and quarter wave plate 70, reflects off of display panel 14, is transmitted through quarter wave plate 70, and is ultimately absorbed by linear polarizer 72.

Figure 8:
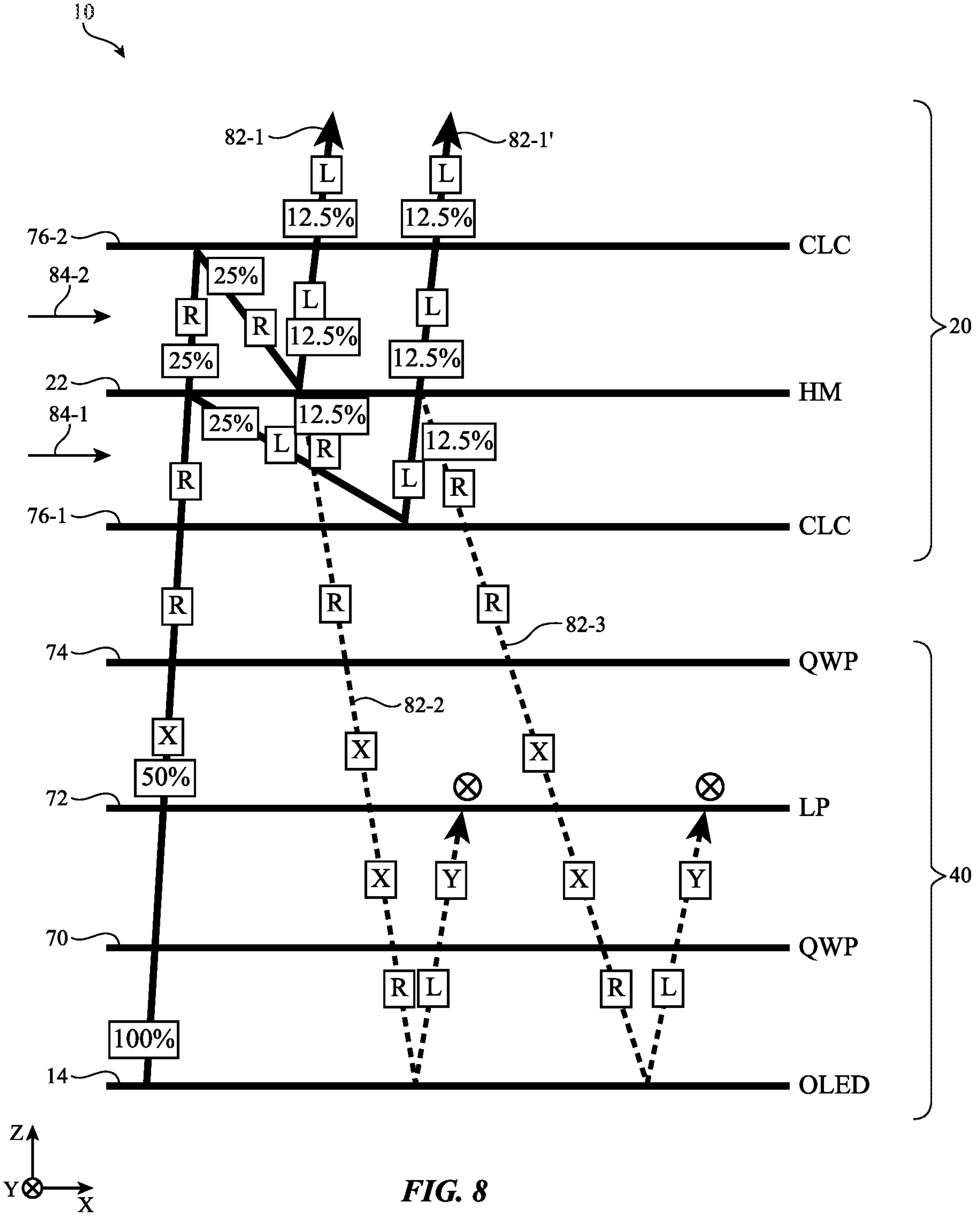
FIG. 8 is a side view of an illustrative electronic device with a display system having a linear polarizer and two quarter wave plates and a lens module having a partially reflective layer and two cholesteric liquid crystal layers in accordance with some embodiments.

In the arrangement of FIG. 8, display system 40 is the same as in FIG. 6. In the arrangement of FIG. 8, lens module 20 includes a first cholesteric liquid crystal layer 76-1, a partially reflective layer 22, and a second cholesteric liquid crystal layer 76-2. Cholesteric liquid crystal layer 76-1 is interposed between display system 40 and partially reflective layer 22. Partially reflective layer 22 is interposed between cholesteric liquid crystal layer 76-1 and cholesteric liquid crystal layer 76-2.

Lens module 20 may be configured to receive circularly polarized light of a given handedness from display system 40 in FIG. 8. Cholesteric liquid crystal layer 76-1 in FIG. 8 is configured to transmit circularly polarized light with the given handedness of the light received from display system 40. Cholesteric liquid crystal layer 76-2 in FIG. 8 is configured to transmit circularly polarized light with the opposite handedness of the light received from display system 40. In other words, lens module 20 in FIG. 8 receives right-handed circularly polarized light from display system 40. Cholesteric liquid crystal layer 76-1 in lens module 20 transmits right-handed circularly polarized light and reflects left-handed circularly polarized light. Cholesteric liquid crystal layer 76-2 in lens module 20 transmits left-handed circularly polarized light and reflects right-handed circularly polarized light.

As shown in FIG. 8, light following a primary path 82-1 is emitted from display panel 14 and passes through quarter wave plate 70, linear polarizer 72, and quarter wave plate 74. The light exits display system 40 as right-handed circularly polarized light. The light passes through cholesteric liquid crystal layer 76-1, is transmitted through partially reflective layer 22, is reflected by cholesteric liquid crystal layer 76-2. is reflected by partially reflective layer 22, and then passes through cholesteric liquid crystal layer 76-2 towards a viewer.

As shown in FIG. 8, some light follows an additional primary path 82-1' that reaches the viewer. Light along path 82-1' is emitted from display panel 14 and passes through quarter wave plate 70, linear polarizer 72, and quarter wave plate 74. The light exits display system 40 as right-handed circularly polarized light. The light passes through cholesteric liquid crystal layer 76-1, is reflected by partially reflective layer 22, is reflected by cholesteric liquid crystal layer 76-1, is transmitted by partially reflective layer 22, and then passes through cholesteric liquid crystal layer 76-2 towards a viewer.

Some of the light along path 82-1 may be transmitted at the second incidence upon partially reflective layer 22. This light instead follows path 82-2 and passes through cholesteric liquid crystal layer 76-1 and reenters display system 40. The light on path 82-2 is transmitted through quarter wave plate 74, linear polarizer 72, and quarter wave plate 70, reflects off of display panel 14, is transmitted through quarter wave plate 70, and is ultimately absorbed by linear polarizer 72.

Some of the light along path 82-1' may be reflected at the second incidence upon partially reflective layer 22. This light instead follows path 82-3 and passes through cholesteric liquid crystal layer 76-1 and reenters display system 40. The light on path 82-3 is transmitted through quarter wave plate 74, linear polarizer 72, and quarter wave plate 70, reflects off of display panel 14, is transmitted through quarter wave plate 70, and is ultimately absorbed by linear polarizer 72.

Figure 9:
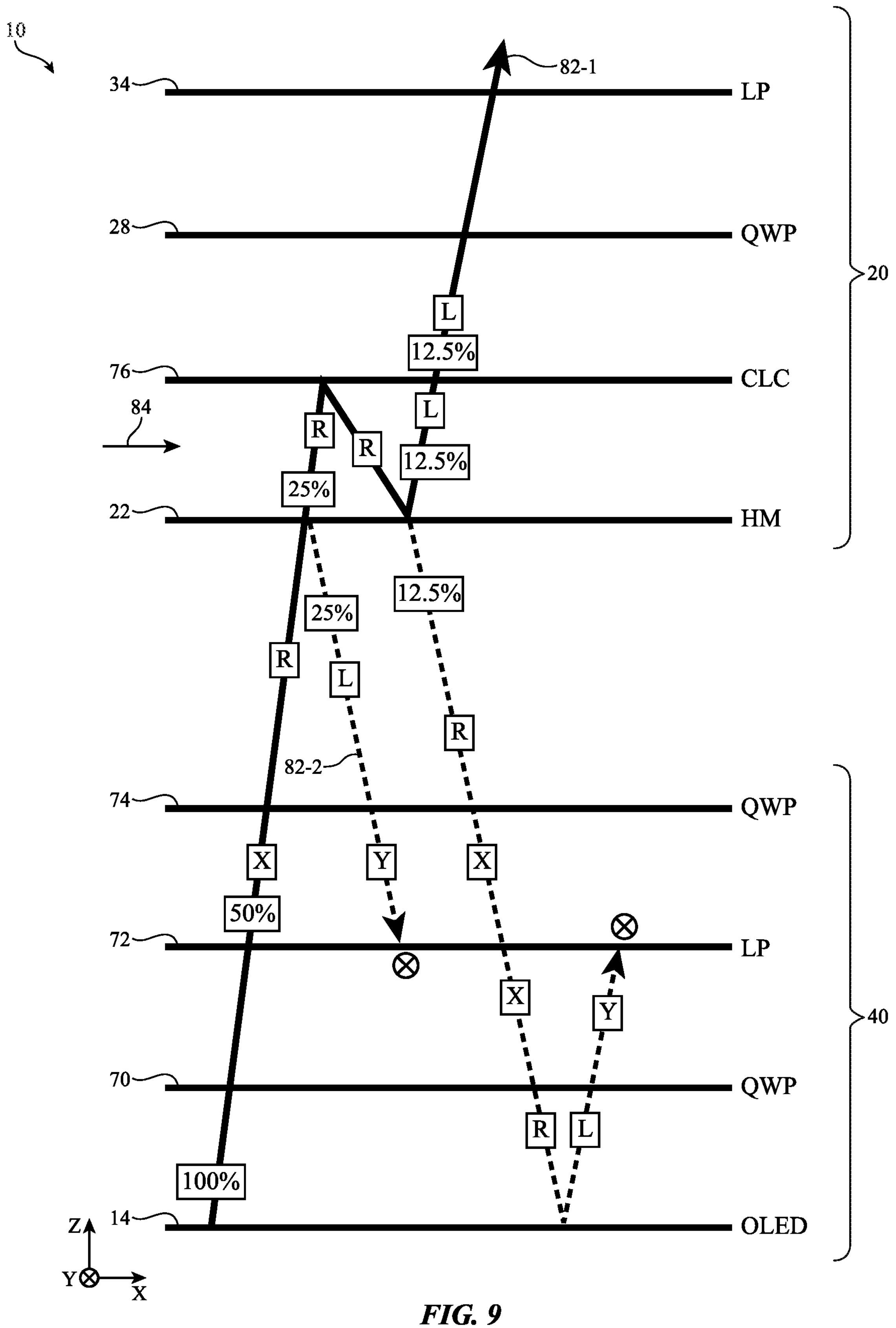
FIG. 9 is a side view of an illustrative electronic device with a display system having a linear polarizer and two quarter wave plates and a lens module having a partially reflective layer interposed between a cholesteric liquid crystal layer and the display system in accordance with some embodiments.

In the arrangement of FIG. 9, display system 40 is the same as in FIG. 6. In the arrangement of FIG. 9, lens module 20 includes a partially reflective layer 22, a cholesteric liquid crystal layer 76, a quarter wave plate 28, and a linear polarizer 34. Partially reflective layer 22 is interposed between display system 40 and cholesteric liquid crystal layer 76. Cholesteric liquid crystal layer 76 is interposed between partially reflective layer 22 and quarter wave plate 28. Quarter wave plate 28 is interposed between cholesteric liquid crystal layer 76 and linear polarizer 34.

Lens module 20 may be configured to receive circularly polarized light of a given handedness from display system 40 in FIG. 9. Cholesteric liquid crystal layer 76 in FIG. 9 is configured to reflect circularly polarized light with the given handedness of the light received from display system 40. In other words, lens module 20 in FIG. 9 receives right-handed circularly polarized light from display system 40. Cholesteric liquid crystal layer 76 in lens module 20 reflects right-handed circularly polarized light and transmits left-handed circularly polarized light.

As shown in FIG. 9, light following a primary path 82-1 is emitted from display panel 14 and passes through quarter wave plate 70, linear polarizer 72, and quarter wave plate 74. The light exits display system 40 as right-handed circularly polarized light. The light passes through partially reflective layer 22, is reflected by cholesteric liquid crystal layer 76, is reflected by partially reflective layer 22, and then passes through cholesteric liquid crystal layer 76, quarter wave plate 28, and linear polarizer 34 towards a viewer.

Some light (along path 82-2) is initially reflected by partially reflective layer 22. This light reenters display system 40, passes through quarter wave plate 74, and is ultimately absorbed by linear polarizer 72.

Some light (along path 82-3) is transmitted by the partially reflective layer 22 at the second incidence of the light upon the partially reflective layer. This light reenters display system 40. The light on path 82-3 is transmitted through quarter wave plate 74, linear polarizer 72, and quarter wave plate 70, reflects off of display panel 14, is transmitted through quarter wave plate 70, and is ultimately absorbed by linear polarizer 72.

Figure 10:
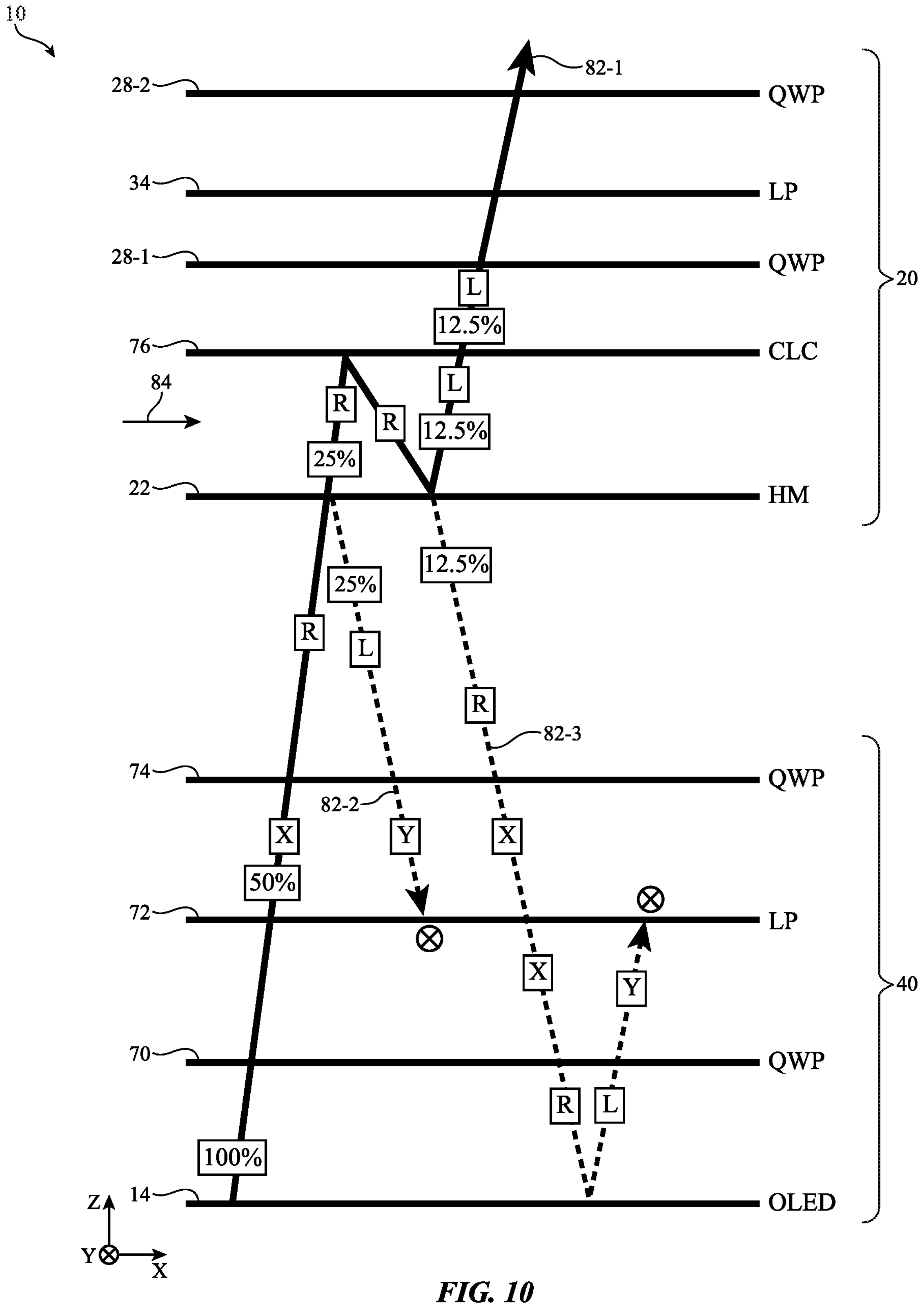
FIG. 10 is a side view of an illustrative electronic device with a display system having a linear polarizer and two quarter wave plates and a lens module having two quarter wave plates and a partially reflective layer interposed between a cholesteric liquid crystal layer and the display system in accordance with some embodiments.

In the arrangement of FIG. 10, display system 40 is the same as in FIG. 6. In the arrangement of FIG. 10, lens module 20 includes a partially reflective layer 22, a cholesteric liquid crystal layer 76, a quarter wave plate 28-1, a linear polarizer 34, and a quarter wave plate 28-2. Partially reflective layer 22 is interposed between display system 40 and cholesteric liquid crystal layer 76. Cholesteric liquid crystal layer 76 is interposed between partially reflective layer 22 and quarter wave plate 28-1. Quarter wave plate 28-1 is interposed between cholesteric liquid crystal layer 76 and linear polarizer 34. Linear polarizer 34 is interposed between quarter wave plate 28-1 and quarter wave plate 28-2.

Lens module 20 may be configured to receive circularly polarized light of a given handedness from display system 40 in FIG. 10. Cholesteric liquid crystal layer 76 in FIG. 10 is configured to reflect circularly polarized light with the given handedness of the light received from display system 40. In other words, lens module 20 in FIG. 10 receives right-handed circularly polarized light from display system 40. Cholesteric liquid crystal layer 76 in lens module 20 reflects right-handed circularly polarized light and transmits left-handed circularly polarized light.

As shown in FIG. 10, light following a primary path 82-1 is emitted from display panel 14 and passes through quarter wave plate 70, linear polarizer 72, and quarter wave plate 74. The light exits display system 40 as right-handed circularly polarized light. The light passes through partially reflective layer 22, is reflected by cholesteric liquid crystal layer 76, is reflected by partially reflective layer 22, and then passes through cholesteric liquid crystal layer 76, quarter wave plate 28-1, linear polarizer 34, and quarter wave plate 28-2 towards a viewer.

Some light (along path 82-2) is initially reflected by partially reflective layer 22. This light reenters display system 40, passes through quarter wave plate 74, and is ultimately absorbed by linear polarizer 72.

Some light (along path 82-3) is transmitted by the partially reflective layer 22 at the second incidence of the light upon the partially reflective layer. This light reenters display system 40. The light on path 82-3 is transmitted through quarter wave plate 74, linear polarizer 72, and quarter wave plate 70, reflects off of display panel 14, is transmitted through quarter wave plate 70, and is ultimately absorbed by linear polarizer 72.

Figure 11:
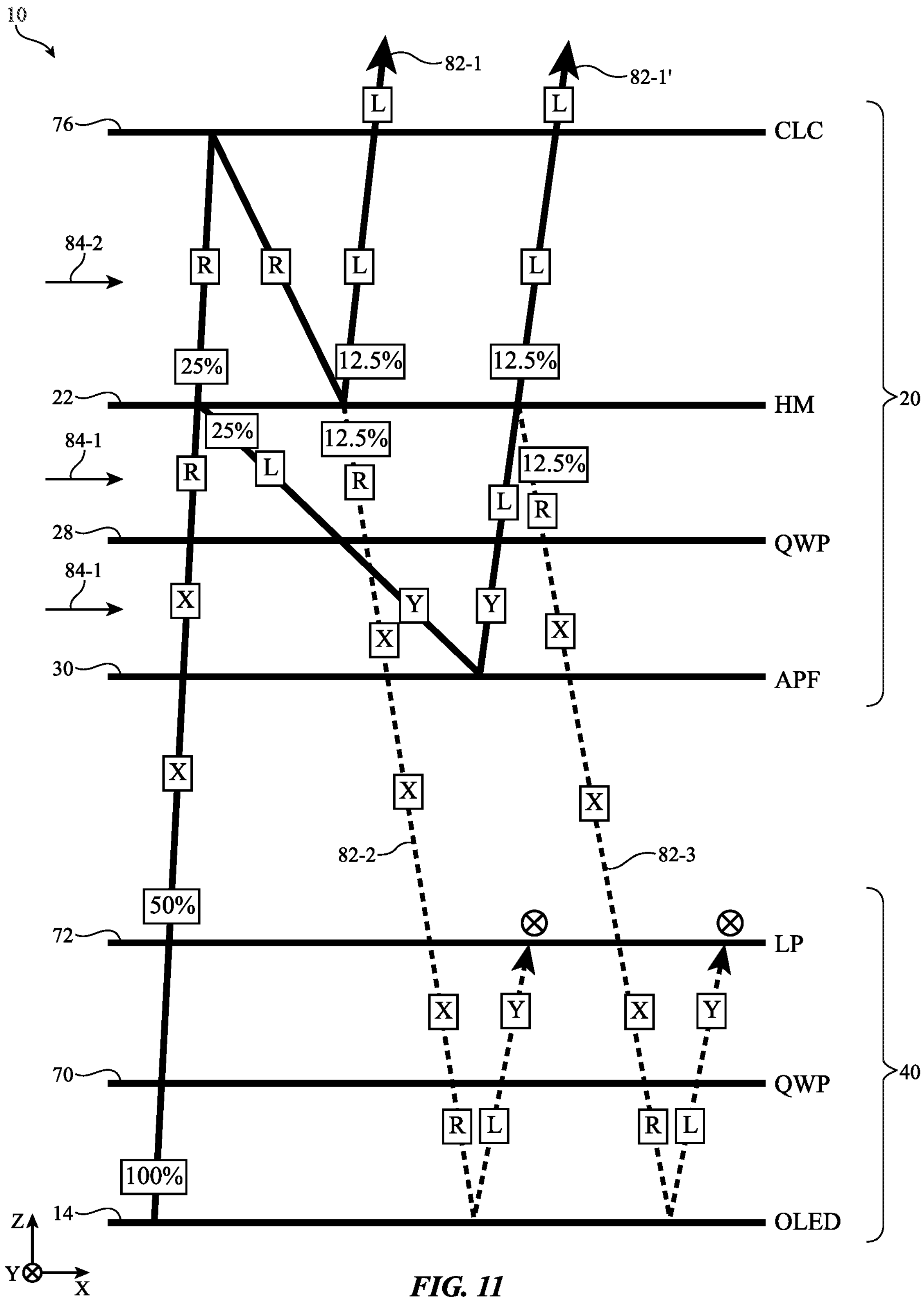
FIG. 11 is a side view of an illustrative electronic device with a display system having a linear polarizer and one quarter wave plate and a lens module having a partially reflective layer, a reflective polarizer, and a cholesteric liquid crystal layer in accordance with some embodiments.

In the arrangement of FIG. 11, display system 40 includes display panel 14, quarter wave plate 70, and linear polarizer 72. Quarter wave plate 70 is interposed between linear polarizer 72 and display panel 14. Linear polarizer 72 is interposed between quarter wave plate 70 and lens module 20.

In the arrangement of FIG. 11, lens module 20 includes a reflective polarizer 30, quarter wave plate 28, partially reflective layer 22, and cholesteric liquid crystal layer 76. Reflective polarizer 30 is interposed between display system 40 and quarter wave plate 28. Quarter wave plate 28 is interposed between reflective polarizer 30 and partially reflective layer 22. Partially reflective layer 22 is interposed between quarter wave plate 28 and cholesteric liquid crystal layer 76.

Lens module 20 may be configured to receive linearly polarized light along a given direction from display system 40 in FIG. 11. Reflective polarizer 30 in FIG. 11 is configured to transmit linearly polarized light along the given direction of the light received from display system 40. In other words, lens module 20 in FIG. 11 receives linearly polarized light along the X-axis from display system 40. Reflective polarizer 30 in lens module 20 transmits linearly polarized light along the X-axis and reflects linearly polarized light along the Y-axis.

Lens module 20 may be configured to transmit circularly polarized light of a given handedness through reflective polarizer 30, quarter wave plate 28, and partially reflective layer 22. Cholesteric liquid crystal layer 76 in FIG. 11 is configured to reflect circularly polarized light with the given handedness of the light received from reflective polarizer 30, quarter wave plate 28, and partially reflective layer 22. In other words, cholesteric liquid crystal layer 76 in FIG. 11 receives right-handed circularly polarized light from reflective polarizer 30, quarter wave plate 28, and partially reflective layer 22. Cholesteric liquid crystal layer 76 in lens module 20 reflects right-handed circularly polarized light and transmits left-handed circularly polarized light.

As shown in FIG. 11, light following a primary path 82-1 is emitted from display panel 14 and passes through quarter wave plate 70 and linear polarizer 72. The light exits display system 40 as linearly polarized light. The light passes through reflective polarizer 30, quarter wave plate 28, and partially reflective layer 22, is reflected by cholesteric liquid crystal layer 76, is reflected by partially reflective layer 22, and then passes through cholesteric liquid crystal layer 76 towards a viewer.

As shown in FIG. 11, some light follows an additional primary path 82-1' that reaches the viewer. Light along path 82-1' is emitted from display panel 14 and passes through quarter wave plate 70 and linear polarizer 72. The light exits display system 40 as linearly polarized light. The light passes through reflective polarizer 30 and quarter wave plate 28, is reflected by partially reflective layer 22, passes through quarter wave plate 28, is reflected by reflective polarizer 30, and then passes through quarter wave plate 28, partially reflective layer 22, and cholesteric liquid crystal layer 76 towards a viewer.

Some of the light along path 82-1 may be transmitted at the second incidence upon partially reflective layer 22. This light instead follows path 82-2 and passes through quarter wave plate 28 and reflective polarizer 30 and reenters display system 40. The light on path 82-2 is transmitted through linear polarizer 72 and quarter wave plate 70, reflects off of display panel 14, is transmitted through quarter wave plate 70, and is ultimately absorbed by linear polarizer 72.

Some of the light along path 82-1' may be reflected at the second incidence upon partially reflective layer 22. This light instead follows path 82-3 and passes through quarter wave plate 28 and reflective polarizer 30 and reenters display system 40. The light on path 82-3 is transmitted through linear polarizer 72 and quarter wave plate 70, reflects off of display panel 14, is transmitted through quarter wave plate 70, and is ultimately absorbed by linear polarizer 72.

Figure 12:
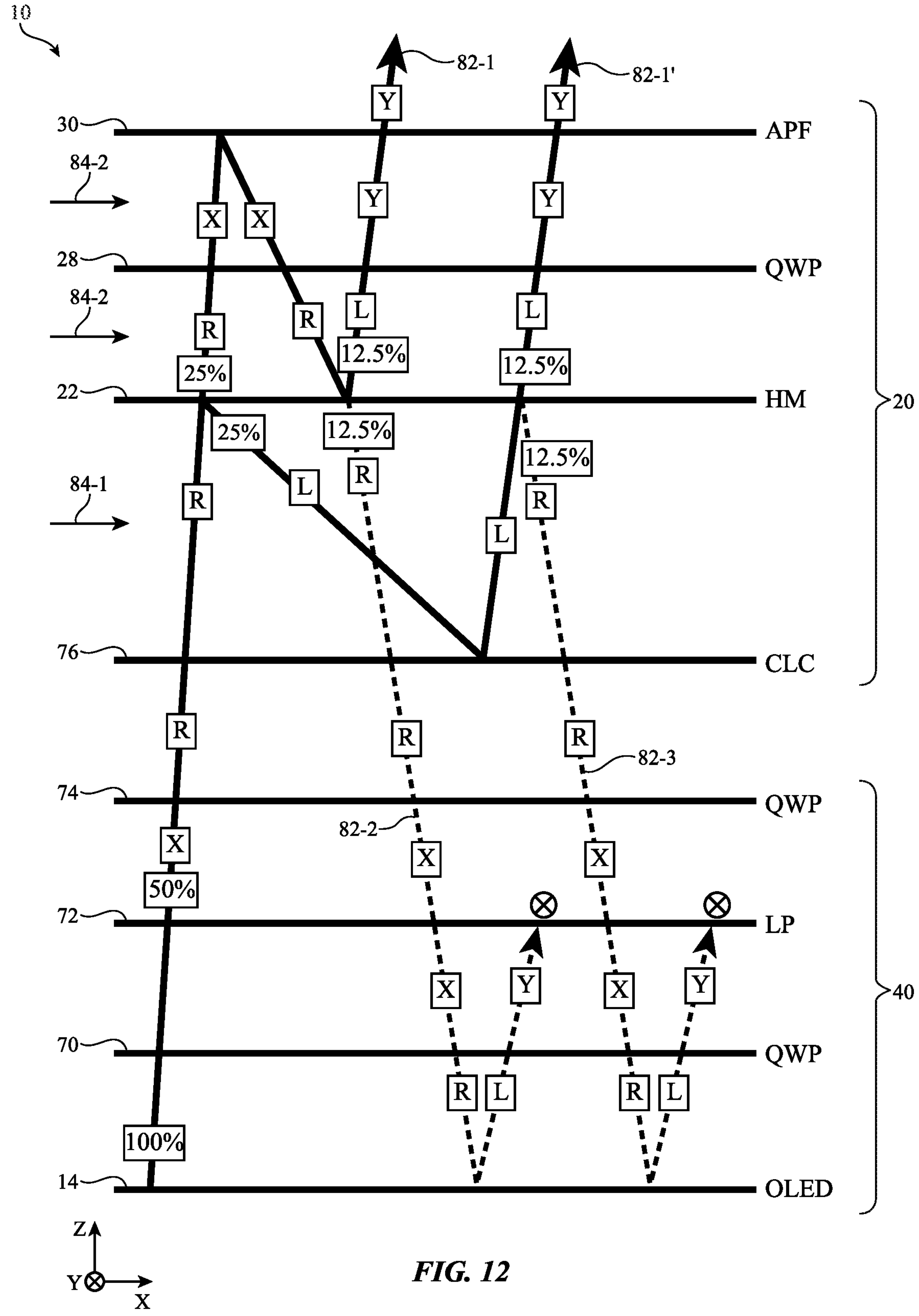
FIG. 12 is a side view of an illustrative electronic device with a display system having a linear polarizer and two quarter wave plates and a lens module having a partially reflective layer, a reflective polarizer, and a cholesteric liquid crystal layer in accordance with some embodiments.

In the arrangement of FIG. 12, display system 40 is the same as in FIG. 6. In the arrangement of FIG. 12, lens module 20 includes a cholesteric liquid crystal layer 76, a partially reflective layer 22, a quarter wave plate 28, and a reflective polarizer 30. Cholesteric liquid crystal layer 76 is interposed between display system 40 and partially reflective layer 22. Partially reflective layer 22 is interposed between cholesteric liquid crystal layer 76 and quarter wave plate 28. Quarter wave plate 28 is interposed between partially reflective layer 22 and reflective polarizer 30.

Lens module 20 may be configured to receive circularly polarized light of a given handedness from display system 40 in FIG. 12. Cholesteric liquid crystal layer 76 in FIG. 12 is configured to transmit circularly polarized light with the given handedness of the light received from display system 40. In other words, lens module 20 in FIG. 12 receives right-handed circularly polarized light from display system 40. Cholesteric liquid crystal layer 76 in lens module 20 transmits right-handed circularly polarized light and reflects left-handed circularly polarized light.

Reflective polarizer 30 may be configured to receive linearly polarized light along a given direction from partially reflective layer 22 and quarter wave plate 28 (at the first incidence upon reflective polarizer 30 along path 82-1). Reflective polarizer 30 in FIG. 12 is configured to transmit linearly polarized light along the given direction of the light received from partially reflective layer 22 and quarter wave plate 28 (at the first incidence upon reflective polarizer 30 along path 82-1). In other words, reflective polarizer 30 in FIG. 12 receives linearly polarized light along the X-axis from partially reflective layer 22 and quarter wave plate 28 (at the first incidence upon reflective polarizer 30 along path 82-1). Reflective polarizer 30 in lens module 20 transmits linearly polarized light along the Y-axis and reflects linearly polarized light along the X-axis.

As shown in FIG. 12, light following a primary path 82-1 is emitted from display panel 14 and passes through quarter wave plate 70, linear polarizer 72, and quarter wave plate 74. The light exits display system 40 as right-handed circularly polarized light. The light passes through cholesteric liquid crystal layer 76, is transmitted through partially reflective layer 22 and quarter wave plate 28, is reflected by reflective polarizer 30, is transmitted through quarter wave plate 28, is reflected by partially reflective layer 22, and then passes through quarter wave plate 28 and reflective polarizer 30 towards a viewer.

As shown in FIG. 12, some light follows an additional primary path 82-1' that reaches the viewer. Light along path 82-1' is emitted from display panel 14 and passes through quarter wave plate 70, linear polarizer 72, and quarter wave plate 74. The light exits display system 40 as right-handed circularly polarized light. The light passes through cholesteric liquid crystal layer 76, is reflected by partially reflective layer 22, is reflected by cholesteric liquid crystal layer 76, is transmitted by partially reflective layer 22, and then passes through quarter wave plate 28 and reflective polarizer 30 towards a viewer.

Some of the light along path 82-1 may be transmitted at the second incidence upon partially reflective layer 22. This light instead follows path 82-2 and passes through cholesteric liquid crystal layer 76 and reenters display system 40. The light on path 82-2 is transmitted through quarter wave plate 74, linear polarizer 72, and quarter wave plate 70, reflects off of display panel 14, is transmitted through quarter wave plate 70, and is ultimately absorbed by linear polarizer 72.

Some of the light along path 82-1' may be reflected at the second incidence upon partially reflective layer 22. This light instead follows path 82-3 and passes through cholesteric liquid crystal layer 76 and reenters display system 40. The light on path 82-3 is transmitted through quarter wave plate 74, linear polarizer 72, and quarter wave plate 70, reflects off of display panel 14, is transmitted through quarter wave plate 70, and is ultimately absorbed by linear polarizer 72.

Figure 13:
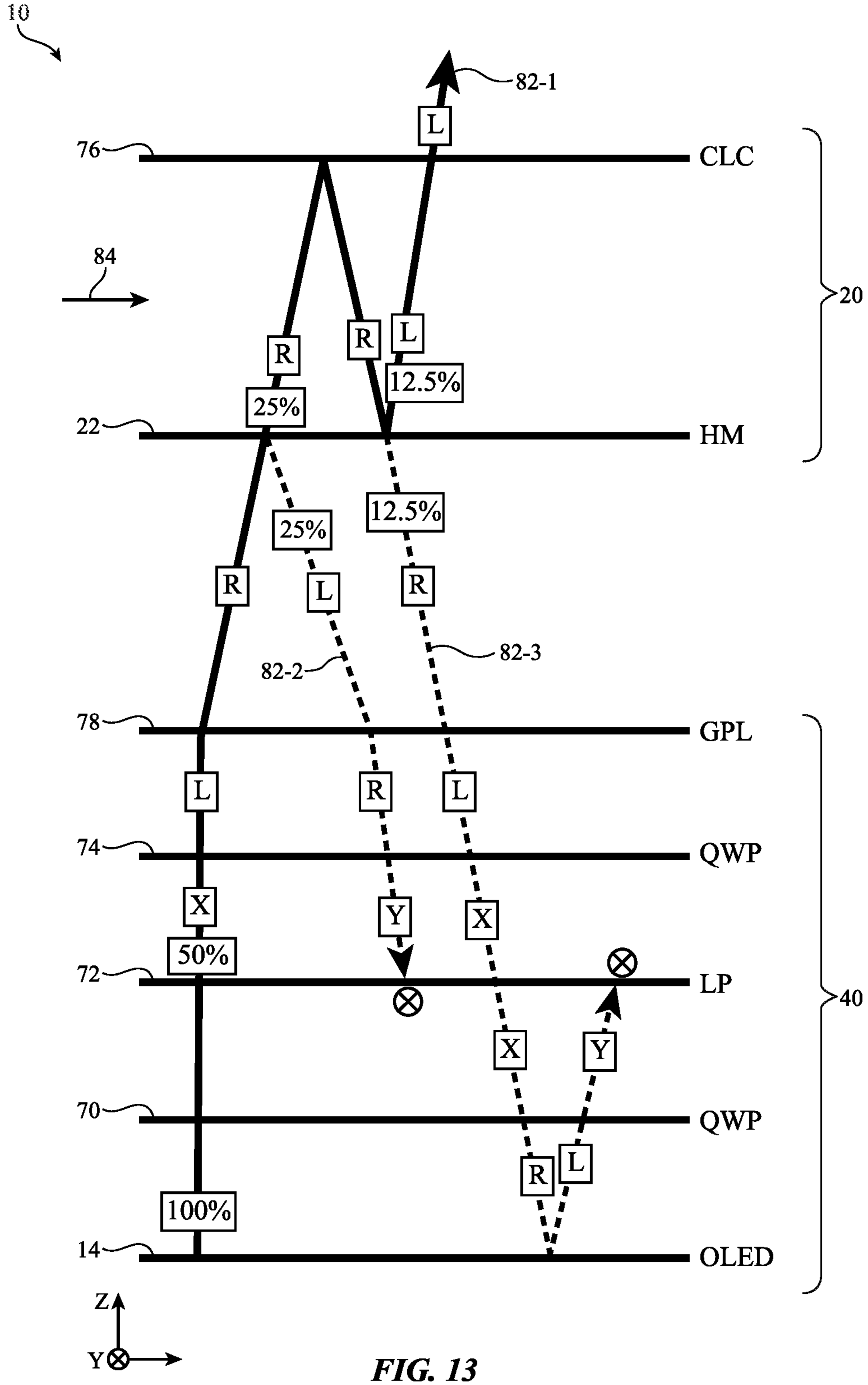
FIG. 13 is a side view of an illustrative electronic device with a display system having a geometric phase lens and a linear polarizer interposed between the geometric phase lens and a display panel and a lens module having a partially reflective layer and a cholesteric liquid crystal layer in accordance with some embodiments.

In the arrangement of FIG. 13, display system 40 includes display panel 14, quarter wave plate 70, linear polarizer 72, quarter wave plate 74, and geometric phase lens 78. Quarter wave plate 70 is interposed between linear polarizer 72 and display panel 14. Linear polarizer 72 is interposed between quarter wave plate 70 and quarter wave plate 74. Quarter wave plate 74 is interposed between linear polarizer 72 and geometric phase lens 78. Geometric phase lens 78 is interposed between quarter wave plate 74 and lens module 20.

In the arrangement of FIG. 13, lens module 20 includes a partially reflective layer 22 and a cholesteric liquid crystal layer 76. Partially reflective layer 22 is interposed between display system 40 and the cholesteric liquid crystal layer 76.

Lens module 20 may be configured to receive circularly polarized light of a given handedness from display system 40. Cholesteric liquid crystal layer 76 in FIG. 13 is configured to reflect circularly polarized light with the given handedness of the light received from display system 40. In other words, lens module 20 in FIG. 13 receives right-handed circularly polarized light from display system 40. Cholesteric liquid crystal layer 76 in lens module 20 reflects right-handed circularly polarized light and transmits left-handed circularly polarized light. These properties also apply to the lens module of FIG. 15.

As shown in FIG. 13, light following a primary path 82-1 is emitted from display panel 14 and passes through quarter wave plate 70, linear polarizer 72, quarter wave plate 74, and geometric phase lens 78. The light exits display system 40 as right-handed circularly polarized light. The light passes through partially reflective layer 22, is reflected from cholesteric liquid crystal layer 76, is reflected from partially reflective layer 22, and then passes through cholesteric liquid crystal layer 76 towards a viewer.

Some light (along path 82-2) is reflected by partially reflective layer 22. This light reenters display system 40, is transmitted through geometric phase lens 78 and quarter wave plate 74, and is ultimately absorbed by linear polarizer 72.

Some light (along path 82-3) is transmitted through partially reflective layer 22 after reflecting off cholesteric liquid crystal layer 76. This light reenters display system 40, is transmitted through geometric phase lens 78, quarter wave plate 74, linear polarizer 72, and quarter wave plate 70, reflects off of display panel 14, is transmitted through quarter wave plate 70, and is ultimately absorbed by linear polarizer 72.

Figure 14:
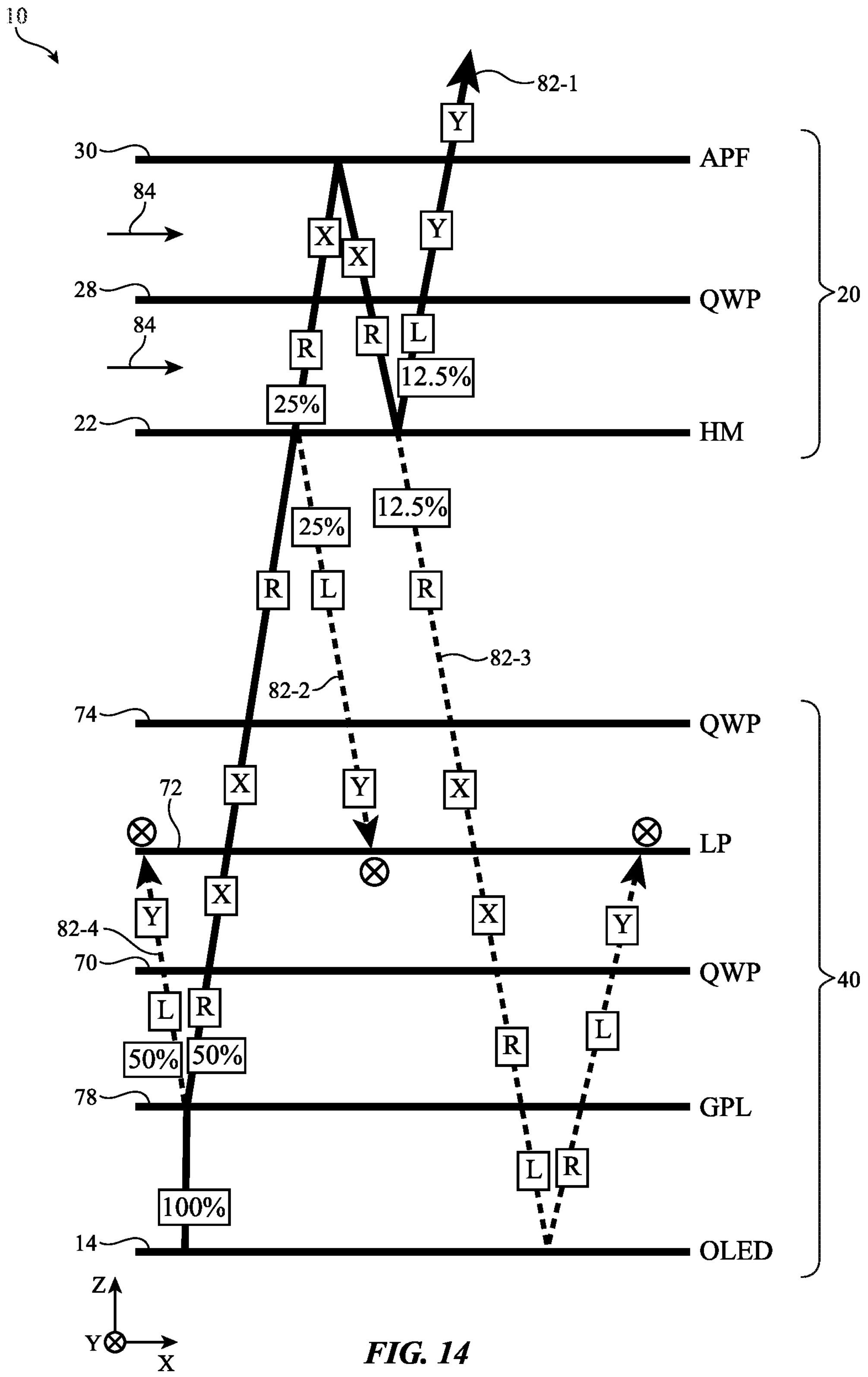
FIG. 14 is a side view of an illustrative electronic device with a lens module having a partially reflective layer and a reflective polarizer and a display system having a geometric phase lens and a linear polarizer interposed between the geometric phase lens and the lens module in accordance with some embodiments.

In the arrangement of FIG. 14, display system 40 includes display panel 14, geometric phase lens 78, quarter wave plate 70, linear polarizer 72, and quarter wave plate 74. Geometric phase lens 78 is interposed between display panel 14 and quarter wave plate 70. Quarter wave plate 70 is interposed between linear polarizer 72 and geometric phase lens 78. Linear polarizer 72 is interposed between quarter wave plate 70 and quarter wave plate 74. Quarter wave plate 74 is interposed between linear polarizer 72 and lens module 20.

In the arrangement of FIG. 14, lens module 20 includes a partially reflective layer 22, a quarter wave plate 28, and a reflective polarizer 30. Partially reflective layer 22 is interposed between display system 40 and quarter wave plate 28. Quarter wave plate 28 is interposed between partially reflective layer 22 and reflective polarizer 30.

As shown in FIG. 14, light following a primary path 82-1 is emitted from display panel 14 and passes through geometric phase lens 78 as right-handed circularly polarized light. This light continues on path 82-1 through quarter wave plate 70, linear polarizer 72, and quarter wave plate 74. The light exits display system 40 as right-handed circularly polarized light. The light passes through partially reflective layer 22 and quarter wave plate 28, is reflected from reflective polarizer 30, passes through quarter wave plate 28, is reflected from partially reflective layer 22, and then passes through quarter wave plate 28 and reflective polarizer 30 towards a viewer.

It is noted that half of the light emitted from the display panel follows path 82-4. This light exits the geometric phase lens as left-handed circularly polarized light that passes through quarter wave plate 70 and is ultimately absorbed by linear polarizer 72.

Some light (along path 82-2) is reflected by partially reflective layer 22. This light reenters display system 40, is transmitted through quarter wave plate 74, and is ultimately absorbed by linear polarizer 72.

Some light (along path 82-3) is transmitted through partially reflective layer 22 after reflecting off reflective polarizer 30. This light reenters display system 40, is transmitted through quarter wave plate 74, linear polarizer 72, quarter wave plate 70, and geometric phase lens 78, reflects off of display panel 14, is transmitted through geometric phase lens 78 and quarter wave plate 70, and is ultimately absorbed by linear polarizer 72.

Figure 15:
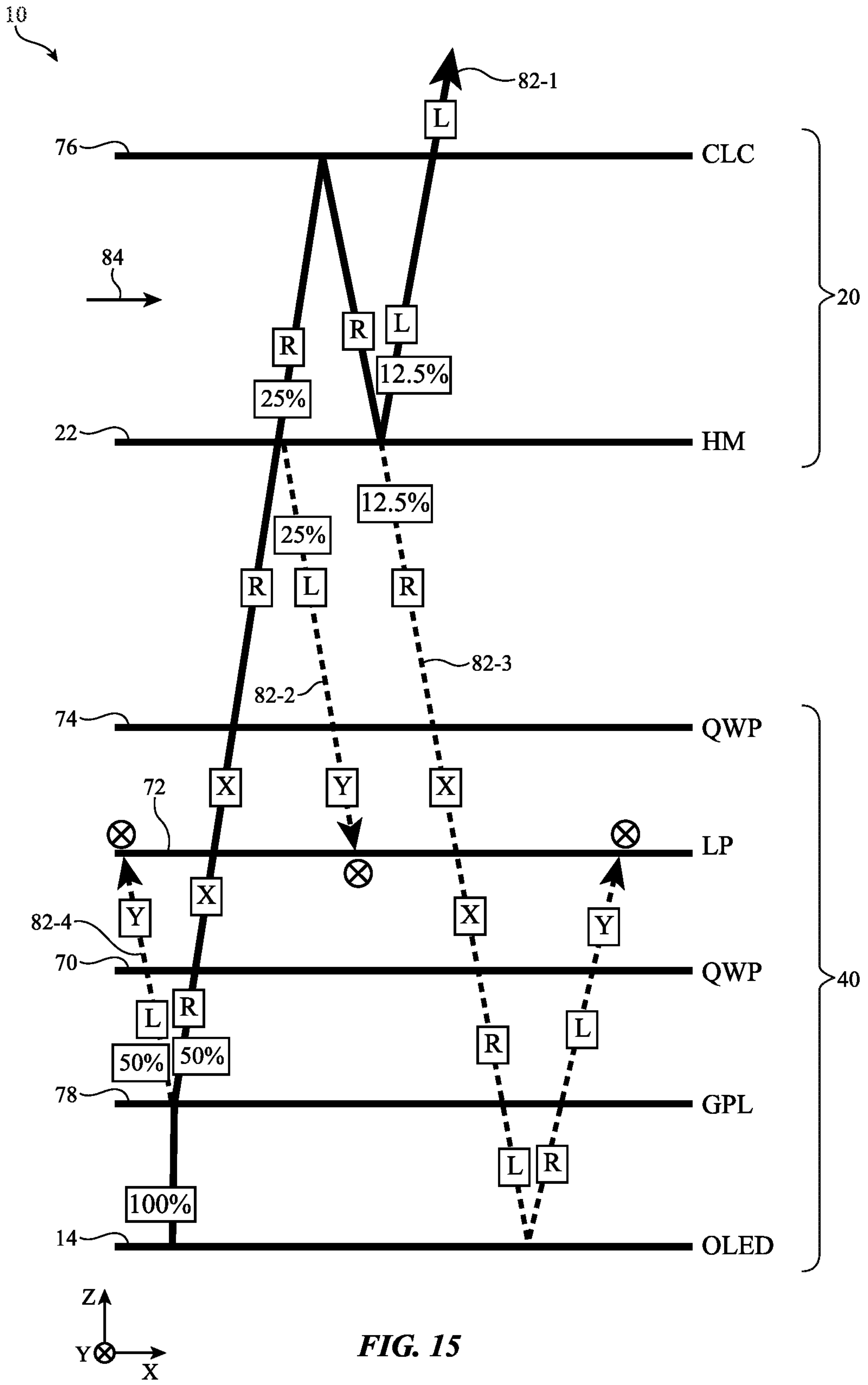
FIG. 15 is a side view of an illustrative electronic device with a lens module having a partially reflective layer and a cholesteric liquid crystal layer and a display system having a geometric phase lens and a linear polarizer interposed between the geometric phase lens and the lens module in accordance with some embodiments.

In the arrangement of FIG. 15, display system 40 is the same as in FIG. 14. In the arrangement of FIG. 15, lens module 20 includes a partially reflective layer 22 and a cholesteric liquid crystal layer 76. Partially reflective layer 22 is interposed between display system 40 and cholesteric liquid crystal layer 76.

As shown in FIG. 15, light following a primary path 82-1 is emitted from display panel 14 and passes through geometric phase lens 78 as right-handed circularly polarized light. This light continues on path 82-1 through quarter wave plate 70, linear polarizer 72, and quarter wave plate 74. The light exits display system 40 as right-handed circularly polarized light. The light passes through partially reflective layer 22, is reflected from cholesteric liquid crystal layer 76, is reflected from partially reflective layer 22, and then passes through cholesteric liquid crystal layer 76 towards a viewer.

It is noted that half of the light emitted from the display panel follows path 82-4. This light exits the geometric phase lens as left-handed circularly polarized light that passes through quarter wave plate 70 and is ultimately absorbed by linear polarizer 72.

Some light (along path 82-2) is reflected at the first incidence upon partially reflective layer 22. This light reenters display system 40, is transmitted through quarter wave plate 74, and is ultimately absorbed by linear polarizer 72.

Some light (along path 82-3) is transmitted through partially reflective layer 22 after reflecting off cholesteric liquid crystal layer 76. This light reenters display system 40, is transmitted through quarter wave plate 74, linear polarizer 72, quarter wave plate 70, and geometric phase lens 78, reflects off of display panel 14, is transmitted through geometric phase lens 78 and quarter wave plate 70, and is ultimately absorbed by linear polarizer 72.

Figure 16:
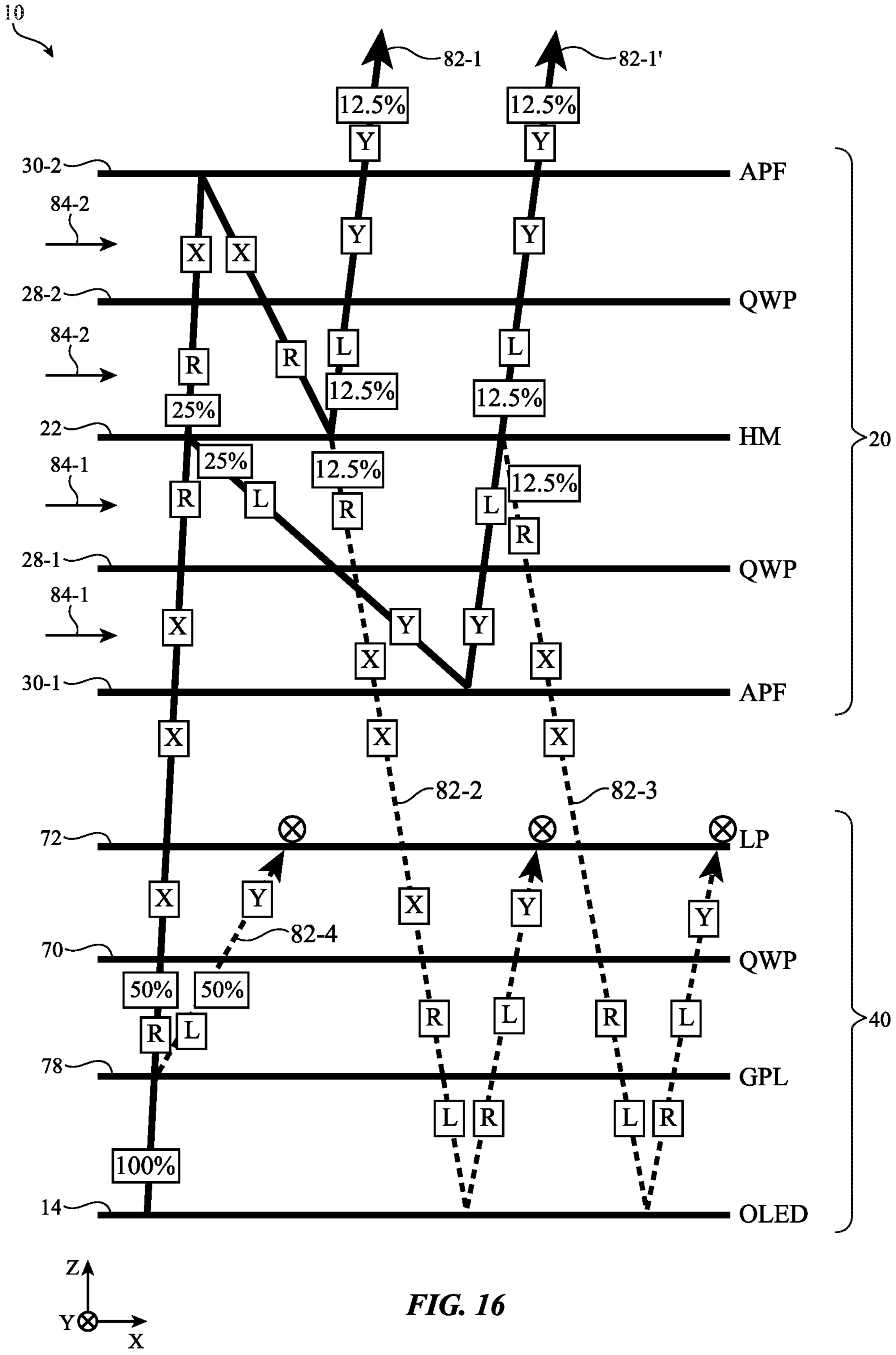
FIG. 16 is a side view of an illustrative electronic device with a lens module having a partially reflective layer and two reflective polarizers and a display system having a geometric phase lens and a linear polarizer interposed between the geometric phase lens and the lens module in accordance with some embodiments.

In the arrangement of FIG. 16, display system 40 includes display panel 14, geometric phase lens 78, quarter wave plate 70, and linear polarizer 72. Geometric phase lens 78 is interposed between display panel 14 and quarter wave plate 70. Quarter wave plate 70 is interposed between linear polarizer 72 and geometric phase lens 78. Linear polarizer 72 is interposed between quarter wave plate 70 and lens module 20.

In the arrangement of FIG. 16, lens module 20 includes a reflective polarizer 30-1, a quarter wave plate 28-1, a partially reflective layer 22, a quarter wave plate 28-2, and a reflective polarizer 30-2. Reflective polarizer 30-1 is interposed between display system 40 and quarter wave plate 28-1. Quarter wave plate 28-1 is interposed between reflective polarizer 30-1 and partially reflective layer 22. Partially reflective layer 22 is interposed between quarter wave plate 28-1 and quarter wave plate 28-2. Quarter wave plate 28-2 is interposed between partially reflective layer 22 and reflective polarizer 30-2.

Lens module 20 may be configured to receive linearly polarized light along a given direction from display system 40 in FIG. 16. Reflective polarizer 30-1 in FIG. 16 is configured to transmit linearly polarized light along the given direction of the light received from display system 40. In other words, lens module 20 in FIG. 16 receives linearly polarized light along the X-axis from display system 40. Reflective polarizer 30-1 in lens module 20 transmits linearly polarized light along the X-axis and reflects linearly polarized light along the Y-axis.

Reflective polarizer 30-2 may have the opposite pass axis orientation as reflective polarizer 30-1. Reflective polarizer 30-2 in lens module 20 transmits linearly polarized light along the Y-axis and reflects linearly polarized light along the X-axis.

As shown in FIG. 16, light following a primary path 82-1 is emitted from display panel 14 and passes through geometric phase lens 78 as right-handed circularly polarized light. This light continues on path 82-1 through quarter wave plate 70 and linear polarizer 72. The light exits display system 40 as linearly polarized light. The light passes through reflective polarizer 30-1, quarter wave plate 28-1, partially reflective layer 22, and quarter wave plate 28-2, is reflected by reflective polarizer 30-2, passes through quarter wave plate 28-2, is reflected by partially reflective layer 22, and then passes through quarter wave plate 28-2 and reflective polarizer 30-2 towards a viewer.

It is noted that half of the light emitted from the display panel follows path 82-4. This light exits the geometric phase lens as left-handed circularly polarized light that passes through quarter wave plate 70 and is ultimately absorbed by linear polarizer 72.

As shown in FIG. 16, some light follows an additional primary path 82-1' that reaches the viewer. Light along path 82-1' is emitted from display panel 14 and passes through geometric phase lens 78, quarter wave plate 70, and linear polarizer 72. The light exits display system 40 as linearly polarized light. The light passes through reflective polarizer 30-1 and quarter wave plate 28-1, is reflected by partially reflective layer 22, passes through quarter wave plate 28-1, is reflected by reflective polarizer 30-1, and then passes through quarter wave plate 28-1, partially reflective layer 22, quarter wave plate 28-2, and reflective polarizer 30-2 towards a viewer.

Some of the light along path 82-1 may be transmitted at the second incidence upon partially reflective layer 22. This light instead follows path 82-2 and passes through quarter wave plate 28-1 and reflective polarizer 30-1 and reenters display system 40. The light on path 82-2 is transmitted through linear polarizer 72, quarter wave plate 70, and geometric phase lens 78, reflects off of display panel 14, is transmitted through geometric phase lens 78 and quarter wave plate 70, and is ultimately absorbed by linear polarizer 72.

Some of the light along path 82-1' may be reflected at the second incidence upon partially reflective layer 22. This light instead follows path 82-3 and passes through quarter wave plate 28-1 and reflective polarizer 30-1 and reenters display system 40. The light on path 82-3 is transmitted through linear polarizer 72, quarter wave plate 70, and geometric phase lens 78, reflects off of display panel 14, is transmitted through geometric phase lens 78 and quarter wave plate 70, and is ultimately absorbed by linear polarizer 72.

Figure 17:
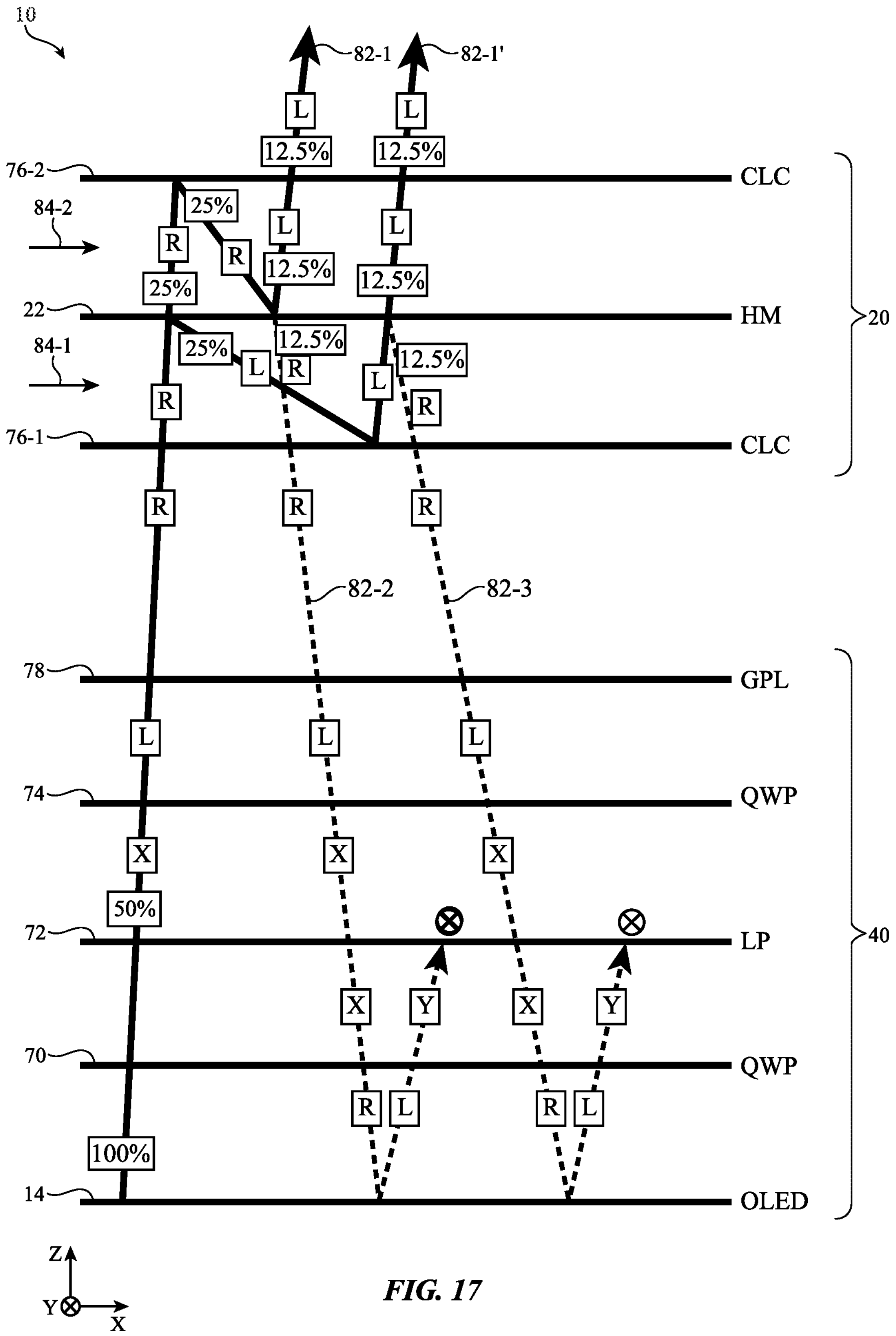
FIG. 17 is a side view of an illustrative electronic device with a lens module having a partially reflective layer and two cholesteric liquid crystal layers and a display system having a geometric phase lens and a linear polarizer interposed between the geometric phase lens and a display panel in accordance with some embodiments.

In the arrangement of FIG. 17, display system 40 is the same as in FIG. 13. In the arrangement of FIG. 17, lens module 20 includes a cholesteric liquid crystal layer 76-1, a partially reflective layer 22, and a cholesteric liquid crystal layer 76-2. Cholesteric liquid crystal layer 76-1 is interposed between display system 40 and partially reflective layer 22. Partially reflective layer 22 is interposed between cholesteric liquid crystal layer 76-1 and cholesteric liquid crystal layer 76-2.

Lens module 20 may be configured to receive circularly polarized light of a given handedness from display system 40 in FIG. 17. Cholesteric liquid crystal layer 76-1 in FIG. 17 is configured to transmit circularly polarized light with the given handedness of the light received from display system 40. In other words, lens module 20 in FIG. 17 receives right-handed circularly polarized light from display system 40. Cholesteric liquid crystal layer 76-1 in lens module 20 transmits right-handed circularly polarized light and reflects left-handed circularly polarized light. Cholesteric liquid crystal layer 76-2 may have the opposite arrangement as cholesteric liquid crystal layer 76-1. Cholesteric liquid crystal layer 76-2 in lens module 20 transmits left-handed circularly polarized light and reflects right-handed circularly polarized light. These properties also apply to the lens module of FIG. 18.

As shown in FIG. 17, light following a primary path 82-1 is emitted from display panel 14 and passes through quarter wave plate 70, linear polarizer 72, quarter wave plate 74, and geometric phase lens 78. The light exits display system 40 as right-handed circularly polarized light. The light passes through cholesteric liquid crystal layer 76-1, is transmitted through partially reflective layer 22, is reflected by cholesteric liquid crystal layer 76-2. is reflected by partially reflective layer 22, and then passes through cholesteric liquid crystal layer 76-2 towards a viewer.

As shown in FIG. 17, some light follows an additional primary path 82-1' that reaches the viewer. Light along path 82-1' is emitted from display panel 14 and passes through quarter wave plate 70, linear polarizer 72, quarter wave plate 74, and geometric phase lens 78. The light exits display system 40 as right-handed circularly polarized light. The light passes through cholesteric liquid crystal layer 76-1, is reflected by partially reflective layer 22, is reflected by cholesteric liquid crystal layer 76-1, is transmitted by partially reflective layer 22, and then passes through cholesteric liquid crystal layer 76-2 towards a viewer.

Some of the light along path 82-1 may be transmitted at the second incidence upon partially reflective layer 22. This light instead follows path 82-2 and passes through cholesteric liquid crystal layer 76-1 and reenters display system 40. The light on path 82-2 is transmitted through geometric phase lens 78, quarter wave plate 74, linear polarizer 72, and quarter wave plate 70, reflects off of display panel 14, is transmitted through quarter wave plate 70, and is ultimately absorbed by linear polarizer 72.

Some of the light along path 82-1' may be reflected at the second incidence upon partially reflective layer 22. This light instead follows path 82-3 and passes through cholesteric liquid crystal layer 76-1 and reenters display system 40. The light on path 82-3 is transmitted through geometric phase lens 78, quarter wave plate 74, linear polarizer 72, and quarter wave plate 70, reflects off of display panel 14, is transmitted through quarter wave plate 70, and is ultimately absorbed by linear polarizer 72.

Figure 18:
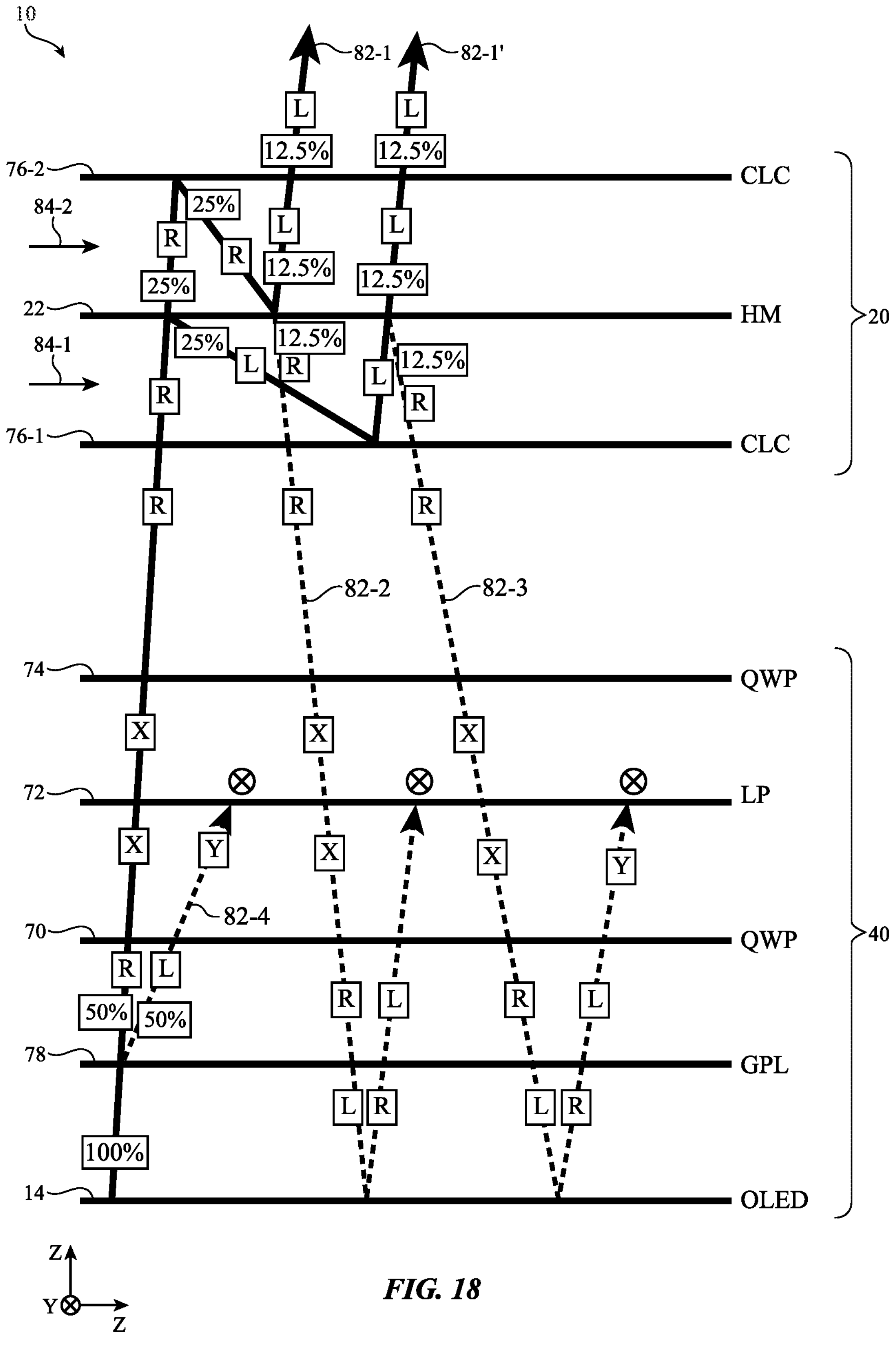
FIG. 18 is a side view of an illustrative electronic device with a lens module having a partially reflective layer and two cholesteric liquid crystal layers and a display system having a geometric phase lens and a linear polarizer interposed between the geometric phase lens and the lens module in accordance with some embodiments.

In the arrangement of FIG. 18, display system 40 is the same as in FIG. 15 and lens module 20 is the same as in FIG. 17.

As shown in FIG. 18, light following a primary path 82-1 is emitted from display panel 14 and passes through geometric phase lens 78, quarter wave plate 70, linear polarizer 72, and quarter wave plate 74. The light exits display system 40 as right-handed circularly polarized light. The light passes through cholesteric liquid crystal layer 76-1, is transmitted through partially reflective layer 22, is reflected by cholesteric liquid crystal layer 76-2. is reflected by partially reflective layer 22, and then passes through cholesteric liquid crystal layer 76-2 towards a viewer.

As shown in FIG. 18, some light follows an additional primary path 82-1' that reaches the viewer. Light along path 82-1' is emitted from display panel 14 and passes through geometric phase lens 78, quarter wave plate 70, linear polarizer 72, and quarter wave plate 74. The light exits display system 40 as right-handed circularly polarized light. The light passes through cholesteric liquid crystal layer 76-1, is reflected by partially reflective layer 22, is reflected by cholesteric liquid crystal layer 76-1, is transmitted by partially reflective layer 22, and then passes through cholesteric liquid crystal layer 76-2 towards a viewer.

It is noted that half of the light emitted from the display panel follows path 82-4. This light exits the geometric phase lens 78 as left-handed circularly polarized light that passes through quarter wave plate 70 and is ultimately absorbed by linear polarizer 72.

Some of the light along path 82-1 may be transmitted at the second incidence upon partially reflective layer 22. This light instead follows path 82-2 and passes through cholesteric liquid crystal layer 76-1 and reenters display system 40. The light on path 82-2 is transmitted through quarter wave plate 74, linear polarizer 72, quarter wave plate 70, and geometric phase lens 78, reflects off of display panel 14, is transmitted through geometric phase lens 78 and quarter wave plate 70, and is ultimately absorbed by linear polarizer 72.

Some of the light along path 82-1' may be reflected at the second incidence upon partially reflective layer 22. This light instead follows path 82-3 and passes through cholesteric liquid crystal layer 76-1 and reenters display system 40. The light on path 82-3 is transmitted through quarter wave plate 74, linear polarizer 72, quarter wave plate 70, and geometric phase lens 78, reflects off of display panel 14, is transmitted through geometric phase lens 78 and quarter wave plate 70, and is ultimately absorbed by linear polarizer 72.

It is noted that each lens module 20 from FIGS. 6-18 may include one or more lens elements such as lens element 26 in FIG. 6.

In FIG. 6, a lens element may be interposed at location 84 between partially reflective layer 22 and cholesteric liquid crystal layer 76. The lens element may have different curvature on first and second opposing surfaces such that partially reflective layer 22 and cholesteric liquid crystal layer 76 have different curvature. The lens module may include one or more additional lens elements if desired.

In FIG. 7, a lens element may be interposed at location 84 between partially reflective layer 22 and cholesteric liquid crystal layer 76. The lens element may have different curvature on first and second opposing surfaces such that partially reflective layer 22 and cholesteric liquid crystal layer 76 have different curvature. The lens module may include one or more additional lens elements if desired.

In FIG. 8, a first lens element may be interposed at location 84-1 between partially reflective layer 22 and cholesteric liquid crystal layer 76-1 and a second lens element may be interposed at location 84-2 between partially reflective layer 22 and cholesteric liquid crystal layer 76-2. The first lens element may have different curvature on first and second opposing surfaces such that partially reflective layer 22 and cholesteric liquid crystal layer 76-1 have different curvature. The second lens element may have different curvature on first and second opposing surfaces such that partially reflective layer 22 and cholesteric liquid crystal layer 76-2 have different curvature. The lens module may include one or more additional lens elements if desired.

In FIG. 9, a lens element may be interposed at location 84 between partially reflective layer 22 and cholesteric liquid crystal layer 76. The lens element may have different curvature on first and second opposing surfaces such that partially reflective layer 22 and cholesteric liquid crystal layer 76 have different curvature. The lens module may include one or more additional lens elements if desired.

In FIG. 10, a lens element may be interposed at location 84 between partially reflective layer 22 and cholesteric liquid crystal layer 76. The lens element may have different curvature on first and second opposing surfaces such that partially reflective layer 22 and cholesteric liquid crystal layer 76 have different curvature. The lens module may include one or more additional lens elements if desired.

In FIG. 11, a first lens element may be interposed at one of locations 84-1 between partially reflective layer 22 and reflective polarizer 30 and a second lens element may be interposed at location 84-2 between partially reflective layer 22 and cholesteric liquid crystal layer 76. The first lens element may have different curvature on first and second opposing surfaces such that partially reflective layer 22 and reflective polarizer 30 have different curvature. The second lens element may have different curvature on first and second opposing surfaces such that partially reflective layer 22 and cholesteric liquid crystal layer 76 have different curvature. The lens module may include one or more additional lens elements if desired.

In FIG. 12, a first lens element may be interposed at location 84-1 between partially reflective layer 22 and cholesteric liquid crystal layer 76 and a second lens element may be interposed at one of locations 84-2 between partially reflective layer 22 and reflective polarizer 30. The first lens element may have different curvature on first and second opposing surfaces such that partially reflective layer 22 and cholesteric liquid crystal layer 76 have different curvature. The second lens element may have different curvature on first and second opposing surfaces such that partially reflective layer 22 and reflective polarizer 30 have different curvature. The lens module may include one or more additional lens elements if desired.

In FIG. 13, a lens element may be interposed at location 84 between partially reflective layer 22 and cholesteric liquid crystal layer 76. The lens element may have different curvature on first and second opposing surfaces such that partially reflective layer 22 and cholesteric liquid crystal layer 76 have different curvature. The lens module may include one or more additional lens elements if desired.

In FIG. 14, a lens element may be interposed at one of locations 84 between partially reflective layer 22 and reflective polarizer 30. The lens element may have different curvature on first and second opposing surfaces such that partially reflective layer 22 and reflective polarizer 30 have different curvature. The lens module may include one or more additional lens elements if desired.

In FIG. 15, a lens element may be interposed at location 84 between partially reflective layer 22 and cholesteric liquid crystal layer 76. The lens element may have different curvature on first and second opposing surfaces such that partially reflective layer 22 and cholesteric liquid crystal layer 76 have different curvature. The lens module may include one or more additional lens elements if desired.

In FIG. 16, a first lens element may be interposed at one of locations 84-1 between partially reflective layer 22 and reflective polarizer 30-1 and a second lens element may be interposed at one of locations 84-2 between partially reflective layer 22 and reflective polarizer 30-2. The first lens element may have different curvature on first and second opposing surfaces such that partially reflective layer 22 and reflective polarizer 30-1 have different curvature. The second lens element may have different curvature on first and second opposing surfaces such that partially reflective layer 22 and reflective polarizer 30-2 have different curvature. The lens module may include one or more additional lens elements if desired.

In FIG. 17, a first lens element may be interposed at location 84-1 between partially reflective layer 22 and cholesteric liquid crystal layer 76-1 and a second lens element may be interposed at location 84-2 between partially reflective layer 22 and cholesteric liquid crystal layer 76-2. The first lens element may have different curvature on first and second opposing surfaces such that partially reflective layer 22 and cholesteric liquid crystal layer 76-1 have different curvature. The second lens element may have different curvature on first and second opposing surfaces such that partially reflective layer 22 and cholesteric liquid crystal layer 76-2 have different curvature. The lens module may include one or more additional lens elements if desired.

In FIG. 18, a first lens element may be interposed at location 84-1 between partially reflective layer 22 and cholesteric liquid crystal layer 76-1 and a second lens element may be interposed at location 84-2 between partially reflective layer 22 and cholesteric liquid crystal layer 76-2. The first lens element may have different curvature on first and second opposing surfaces such that partially reflective layer 22 and cholesteric liquid crystal layer 76-1 have different curvature. The second lens element may have different curvature on first and second opposing surfaces such that partially reflective layer 22 and cholesteric liquid crystal layer 76-2 have different curvature. The lens module may include one or more additional lens elements if desired.

A display system and lens assembly of the type shown in FIGS. 6-18 may be included for each eye of the viewer (e.g., a first lens assembly for the left eye and a second lens assembly for the right eye). It is further noted that light may be refracted one or more times when passing through lens assembly 20.

In FIGS. 6-18, each adjacent pair of components may optionally be attached using an optically clear adhesive layer. Each adjacent pair of components in FIGS. 6-18 may alternatively be coated directly to one another without an intervening adhesive layer.

The examples of polarizations given in connection with FIGS. 6-18 are merely illustrative. In general, the handedness of circularly polarized light and the direction of linearly polarized light may be switched for each embodiment if desired.

Any of the cholesteric liquid crystal layers described herein may have three layers tuned to three wavelengths of light (as in FIG. 4A) or may have a gradient (as in FIG. 4B) if desired.

Each one of the lens modules and display systems in FIGS. 6-18 may contribute to a lightweight electronic device with mitigated ghosting artifacts. When two primary paths that reach the viewer are used (e.g., as in FIGS. 8, 11, 16, 17, and 18), a higher percentage of light emitted from the display reaches the viewer (compared to when there is only one primary path that reaches the viewer) which improves the efficiency of the display. Using a geometric phase lens (e.g., as in FIGS. 13-18) may mitigate color shift.

The foregoing is merely illustrative and various modifications can be made to the described embodiments. The foregoing embodiments may be implemented individually or in any combination.

What is claimed is:

1. An electronic device, comprising:
- a display system that comprises:
  - an array of display pixels;
  - a linear polarizer; and
  - at least one quarter wave plate; and
- a lens module that receives light from the display system and that comprises:
  - a lens element;
  - a cholesteric liquid crystal layer that is interposed between the lens element and the display system; and
  - a partially reflective layer, wherein the lens element is interposed between the cholesteric liquid crystal layer and the partially reflective layer.

2. The electronic device defined in claim 1, wherein the at least one quarter wave plate comprises first and second quarter wave plates.

3. The electronic device defined in claim 2, wherein the linear polarizer is interposed between the first and second quarter wave plates.

4. The electronic device defined in claim 3, wherein the display system further comprises:
- a geometric phase lens that is interposed between linear polarizer and the lens module.

5. The electronic device defined in claim 3, wherein the display system further comprises:
- a geometric phase lens that is interposed between linear polarizer and the array of display pixels.

6. The electronic device defined in claim 1, wherein the lens module further comprises:
- an additional quarter wave plate, wherein the partially reflective layer is interposed between the additional quarter wave plate and the cholesteric liquid crystal layer.

7. The electronic device defined in claim 6, wherein the lens module further comprises:
- an additional linear polarizer, wherein the additional quarter wave plate is interposed between the partially reflective layer and the linear polarizer.

8. The electronic device defined in claim 6, wherein the lens module further comprises:
- a reflective polarizer, wherein the additional quarter wave plate is interposed between the partially reflective layer and the reflective polarizer.

9. The electronic device defined in claim 1, wherein the lens module further comprises:
- an additional cholesteric liquid crystal layer, wherein the partially reflective layer is interposed between the cholesteric liquid crystal layer and the additional cholesteric liquid crystal layer.

10. An electronic device, comprising:
- a display system that comprises:
  - an array of display pixels;
  - a first linear polarizer; and
  - a first quarter wave plate; and
- a lens module that receives light from the display system and that comprises:
  - a lens element;
  - a partially reflective layer that is interposed between the lens element and the display system;
  - a cholesteric liquid crystal layer, wherein the lens element is interposed between the cholesteric liquid crystal layer and the partially reflective layer;
  - a second quarter wave plate, wherein the cholesteric liquid crystal layer is interposed between the second quarter wave plate and the partially reflective layer; and a second linear polarizer, wherein the second quarter wave plate is interposed between the second linear polarizer and the cholesteric liquid crystal layer.

11. The electronic device defined in claim 10, wherein the lens module further comprises:

a third quarter wave plate, wherein the second linear polarizer is interposed between the second quarter wave plate and the third quarter wave plate.

12. An electronic device, comprising:

a display system that comprises:

an array of display pixels;

a linear polarizer; and at least one quarter wave plate; and a lens module that receives light from the display system and that comprises:

a reflective polarizer;

a partially reflective layer;

a cholesteric liquid crystal layer;

a first lens element that is interposed between the reflective polarizer and the partially reflective layer; and a second lens element that is interposed between the partially reflective layer and the cholesteric liquid crystal layer.

13. The electronic device defined in claim 12, wherein the reflective polarizer is interposed between the first lens element and the display system.

14. The electronic device defined in claim 12, wherein the lens module further comprises:

an additional quarter wave plate that is interposed between the reflective polarizer and the partially reflective layer.

15. An electronic device, comprising:

a display system that comprises:

an array of display pixels;

a linear polarizer;

at least one quarter wave plate; and a geometric phase lens; and a lens module that receives light from the display system and that comprises:

a cholesteric liquid crystal layer;

a partially reflective layer; and a lens element that is interposed between the cholesteric liquid crystal layer and the partially reflective layer.

16. The electronic device defined in claim 15, wherein the partially reflective layer is interposed between the cholesteric liquid crystal layer and the display system.

17. The electronic device defined in claim 15, wherein the at least one quarter wave plate comprises first and second quarter wave plates, wherein the linear polarizer is interposed between the first and second quarter wave plates, and wherein the linear polarizer is interposed between the array of display pixels and the geometric phase lens.

18. The electronic device defined in claim 15, wherein the at least one quarter wave plate comprises first and second quarter wave plates, wherein the linear polarizer is interposed between the first and second quarter wave plates, and wherein the geometric phase lens is interposed between the array of display pixels and the linear polarizer.

* * * * *